(12) United States Patent
Zhang et al.

(10) Patent No.: US 11,316,934 B2
(45) Date of Patent: Apr. 26, 2022

(54) METHOD FOR PROVIDING A SERVICE TO A USER EQUIPMENT CONNECTED TO A FIRST OPERATOR NETWORK VIA A SECOND OPERATOR NETWORK

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Shuang Zhang, Delft (NL); Adrianus Holtzer, Delft (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/064,387

(22) PCT Filed: Dec. 22, 2016

(86) PCT No.: PCT/EP2016/082444
§ 371 (c)(1),
(2) Date: Jun. 20, 2018

(87) PCT Pub. No.: WO2017/114757
PCT Pub. Date: Jul. 6, 2017

(65) Prior Publication Data
US 2019/0007502 A1 Jan. 3, 2019

(30) Foreign Application Priority Data
Dec. 28, 2015 (EP) .................................. 15202808

(51) Int. Cl.
*H04L 29/08* (2006.01)
*H04W 8/06* (2009.01)
(Continued)

(52) U.S. Cl.
CPC ............. *H04L 67/16* (2013.01); *G06Q 10/06* (2013.01); *G06Q 50/32* (2013.01); *H04W 8/06* (2013.01);
(Continued)

(58) Field of Classification Search
CPC ......... H04L 67/16; H04L 29/08; G06Q 10/06; G06Q 50/32; H04W 8/06; H04W 8/10; H04W 8/12; H04W 8/18; H04W 88/18
See application file for complete search history.

(56) References Cited

U.S. PATENT DOCUMENTS 8,326,283 B1 * 12/2012 Hursey .................. H04W 8/04
455/432.1
8,477,610 B2 7/2013 Zuo et al.
(Continued)

FOREIGN PATENT DOCUMENTS

EP   2 086 180 A1   8/2009
EP   2086180 A1 *  8/2009 .............. H04W 8/02
(Continued)

OTHER PUBLICATIONS

Tanaka, Katsuya et al., "Design of a Personalized Video Streaming Framework Providing a Flexible Service Structure," The Institute of Electronics, Information and Communication Engineers, Technical Report, vol. 114, No. 335, pp. 7-12 (Nov. 20, 2014).
(Continued)

*Primary Examiner* — John A Follansbee
*Assistant Examiner* — Fadi Haj Said
(74) *Attorney, Agent, or Firm* — Hamilton, Brook, Smith & Reynolds, P.C.

(57) ABSTRACT

One aspect of the disclosure relates to a method for providing a service to a user equipment connected to a first
(Continued)

operator network. The second operator network comprises a register containing subscription information of the user equipment. The method comprises a number of steps. One of these steps is receiving from the first operator network a service request of the user equipment, the service request being associated with the service. Another step is obtaining a service-deployment-specification for the second operator network comprising at least one network function associated with the service on the basis of the service request. Yet another step is converting the service-deployment-specification for the second operator network into a generic specification, the generic specification enabling execution of the at least one network function in the first operator network for providing the service to the user equipment. Yet another step is transmitting the generic specification to the first operator network. The invention further relates to systems and nodes in the first and second operator network, and to a computer program product for performing methods for providing the service.

22 Claims, 16 Drawing Sheets

(51) Int. Cl.
| | |
|---|---|
| H04W 8/10 | (2009.01) |
| H04W 8/12 | (2009.01) |
| G06Q 50/32 | (2012.01) |
| G06Q 10/06 | (2012.01) |
| H04W 8/18 | (2009.01) |
| H04W 88/18 | (2009.01) |
| H04L 67/51 | (2022.01) |

(52) U.S. Cl.
CPC .............. *H04W 8/10* (2013.01); *H04W 8/12* (2013.01); *H04W 8/18* (2013.01); *H04W 88/18* (2013.01)

(56) References Cited

U.S. PATENT DOCUMENTS

| | | | | |
|---|---|---|---|---|
| 8,676,159 | B1* | 3/2014 | Shu | H04W 76/22 |
| | | | | 455/410 |
| 9,077,553 | B2* | 7/2015 | Paredes | H04L 41/50 |
| 9,445,279 | B2 | 9/2016 | Li et al. | |
| 9,569,587 | B2 | 2/2017 | Ansari et al. | |
| 9,703,582 | B1* | 7/2017 | Chigurapati | G06F 9/45558 |
| 9,762,679 | B2* | 9/2017 | Gast | H04L 67/16 |
| 9,781,016 | B1* | 10/2017 | Marquardt | H04L 41/5054 |
| 9,866,472 | B2 | 1/2018 | Biancaniello | |
| 10,000,350 | B2 | 6/2018 | Hirata | |
| 10,021,738 | B1* | 7/2018 | Mehta | H04W 92/02 |
| 10,055,240 | B2 | 8/2018 | Chastain et al. | |
| 10,057,109 | B2* | 8/2018 | Shatzkamer | G06F 9/455 |
| 10,079,897 | B2 | 9/2018 | Cortes Gomez | |
| 10,120,714 | B1 | 11/2018 | Cabrera et al. | |
| 10,205,719 | B2 | 2/2019 | Feng et al. | |
| 10,581,703 | B2 | 3/2020 | Strijkers et al. | |
| 2001/0049790 | A1* | 12/2001 | Faccin | H04W 8/18 |
| | | | | 713/185 |
| 2005/0220039 | A1 | 10/2005 | Hoshino et al. | |
| 2008/0263212 | A1* | 10/2008 | Goix | H04L 29/06027 |
| | | | | 709/228 |
| 2011/0145806 | A1 | 6/2011 | Cook | |
| 2012/0134323 | A1* | 5/2012 | Perkuhn | H04W 8/06 |
| | | | | 370/328 |
| 2012/0271949 | A1 | 10/2012 | Radhakrishnan et al. | |
| 2013/0095828 | A1* | 4/2013 | Hursey | H04W 8/18 |
| | | | | 455/433 |
| 2013/0103624 | A1 | 4/2013 | Thieberger | |
| 2013/0103642 | A1 | 4/2013 | Thieberger | |
| 2013/0110778 | A1* | 5/2013 | Taylor | G06F 11/1435 |
| | | | | 707/624 |
| 2014/0229945 | A1 | 8/2014 | Barkai et al. | |
| 2014/0317261 | A1* | 10/2014 | Shatzkamer | G06F 9/455 |
| | | | | 709/223 |
| 2015/0039762 | A1* | 2/2015 | Xie | H04L 47/803 |
| | | | | 709/225 |
| 2016/0094988 | A1* | 3/2016 | Lee | H04L 9/0825 |
| | | | | 380/270 |
| 2016/0227394 | A1* | 8/2016 | Savkovic | H04W 8/12 |
| 2016/0286378 | A1* | 9/2016 | Salmela | H04L 29/06 |
| 2017/0086231 | A1* | 3/2017 | Kim | H04W 76/10 |
| 2017/0142206 | A1* | 5/2017 | Kodaypak | H04L 12/1407 |
| 2017/0250917 | A1 | 8/2017 | Ruckstuhl et al. | |
| 2017/0288909 | A1 | 10/2017 | Bottorff et al. | |
| 2017/0302623 | A1 | 10/2017 | Bifulco et al. | |
| 2017/0346704 | A1 | 11/2017 | Strijkers et al. | |
| 2017/0353980 | A1* | 12/2017 | Strijkers | H04W 72/0486 |
| 2018/0198717 | A1 | 7/2018 | Khasnabish et al. | |
| 2018/0270724 | A1* | 9/2018 | Horn | H04W 8/08 |

FOREIGN PATENT DOCUMENTS

| | | | |
|---|---|---|---|
| JP | 2005-284753 A | 10/2005 | |
| JP | 2009-505561 A | 2/2009 | |
| JP | 2009-277217 A | 11/2009 | |
| JP | 2014-192856 A | 10/2014 | |
| JP | 2018/508062 A | 3/2018 | |
| WO | WO 2006/114407 A1 | 11/2006 | |
| WO | WO 2007/0213 01 A2 | 2/2007 | |
| WO | WO 2016/102297 A1 | 6/2016 | |
| WO | WO-2017054841 A1 * | 4/2017 | H04W 8/08 |

OTHER PUBLICATIONS

Tsubouchi, Koji et al., "NFV Management and Orchestration Technology to Automatically Build Network Services on Demand," The Institute of Electronics, Information and Communication Engineers, Technical Report, vol. 114, No. 206, pp. 107-112 (Sep. 4, 2014).
Kojima, Hisashi et al., "Service chaining methods for network function virtualization on carrier networks," The Institute of Electronics, Information and Communication Engineers, Technical Report, vol. 113, No. 205, pp. 13-18 (Sep. 5, 2013).
International Search Report entitled: Method for Providing a Service to a User Equipment Connected to a First Operator Network via a Second Operator Network, for PCT/EP2016/082444, dated Feb. 24, 2017.
European Search Report for EP Application No. 15202808.0, dated Sep. 9, 2016.
Kueh et al., "Application of Context Transfer for Roaming in IP-Based Evolved 3G Networks," Personal, Indoor and Mobile Radio Communications, IEEE 17th Inter National Syposium, pp. 1-5, (Sep. 1, 2006).
3GPP ETSI TS 123 002 v13.4.0 "Digital Cellular Telecommunications System—Network Architecture," (Mar. 2016).
Chiosi, M., et al. "Network Functions Virtualisation—Intorductory White Paper—An Introduction, Benefits, Enablers, Challenges & Call for Action." Published at the "SDN and OpenFlow World Congress" meeting in Darmstadt-Germany, Oct. 22-24, 2012.
Chiosi, M., et al., "Network Functions Virtualisation (NFV)—Network Operator Perspectives on Industry Progress." Published at the "SDN and OpenFlow World Congress" meeting in Frankfurt-Germany, Oct. 15-17, 2013.
Sahai, A., et al., "NFV ISG PoC: Subscriber Aware SGi/Gi-LAN Virtualization." Intel Developer Forum, San Francisco, (Sep. 9-11, 2014).
Derakhshan, F., et al., "Enabling Cloud Connectivity using SDN and NFV Technologies", Conference Paper, Sep. 2013.
Wikipedia—System Architecture Evolution (Evolved Packet Core (EPC); URL: https://en.wikipedia.org/wiki/System_Architecture_Evolution; downloaded on Jul. 8, 2021.
Quinn, P., et al., "Service Function Chaining Problem Statement." Network Working Group, Internet-Draft, p. 1-19, (Aug. 11, 2014).

(56) References Cited

OTHER PUBLICATIONS

Cristea, M.L., et al., "Supporting communities in programmable grid networks: gTBN." IFIP/IEEE International Symposium on Integrated Network Management (2009).
Nordstrom, E., et al., "Serval: An end-host stack for service-centric networking" Proceedings of the 9th USENIX conference on Networked Systems Design and Implementation, pp. 1-14 (2012).

* cited by examiner

METHOD FOR PROVIDING A SERVICE TO A USER EQUIPMENT CONNECTED TO A FIRST OPERATOR NETWORK VIA A SECOND OPERATOR NETWORK

This application is the U.S. National Stage of International Application No. PCT/EP2016/082444, filed Dec. 22, 2016, which designates the U.S., published in English, and claims priority under 35 U.S.C. § 119 or 365(c) to European Application No. 15202808.0, filed Dec. 28, 2015. The entire teachings of the above applications are incorporated herein by reference.

FIELD OF THE INVENTION

The invention relates to methods for providing a service to a user equipment connected to a first operator network, wherein a second operator network comprises a register containing subscription information of the user equipment. The invention further relates to systems and nodes in the first and second operator network, and to a computer program product for performing the methods.

BACKGROUND OF THE INVENTION

A user equipment that is connected to an operator network may request certain services to be executed in the operator network. The user equipment may for example request that a video stream is initiated and directed towards the user equipment so that a video can be presented to a user.

Typically a plurality of network functions need to be executed to provide a service. Network functions can be embedded in a physical network element or be a software instance (e.g. a virtual network function), running on a (virtualized) physical infrastructure. Network Function Virtualization (NFV) is a method to decouple network functions, e.g. router, firewall, application layer gateway, virus scanner, from physical devices using virtualization technologies, such as VMware. Virtualization enables physical devices to be regarded as resources on which network functions can be loaded dynamically. For example, when a network function is required to filter traffic at a certain location in a network, NFV allows allocation of a firewall network function to a physical device (e.g. a cloud data centre). NFV thus enables that a network can be dynamically configured in dependence of the services it needs to provide.

Service Function Chaining (SFC) is a concept used in NFV to describe an ordered set of one or more network functions that together form a service. Based on the SFC, traffic is correctly guided along a set of network functions so that the service can be provided.

If a user equipment is connected to its home operator network, i.e. the network of the operator with which the user has a subscription, services can be provided to the user equipment using a method described in European patent application 14200309.4. Herein a method is described for controlling on-demand service provisioning in a network comprising resources for providing a service. The described method comprises the steps of: intercepting a service request for providing the service; determining at least a first operator network function required for the service associated with the service request; and instantiating the at least first operator network function on a resource in the network for executing the service in the network.

A problem, however, may occur when the user equipment is not connected to the home network, but to a visited network, for example because the user is roaming. The visited network may not be configured to correctly process a service request of the user equipment and provide the service.

SUMMARY

The present disclosure aims to enable that services may be provided to a user of a user equipment, irrespective of whether the user equipment is connected to its home network, or to a visited network. A user may be accustomed to certain services and by enabling that these services may also be provided when the user equipment is connected to a visited network, a more constant user experience for the user may be achieved.

To that end, one aspect of the disclosure relates to a method for providing a service to a user equipment connected to a first operator network, e.g. a visited network. The second operator network comprises a register containing subscription information of the user equipment. The second operator network may be the home network of the user equipment. The method comprises a number of steps. One of these steps is receiving from the first operator network a service request of the user equipment, the service request being associated with the service. Another step is obtaining a service-deployment-specification for the second operator network comprising at least one network function associated with the service on the basis of the service request. Yet another step is converting the service-deployment-specification for the second operator network into a generic specification, the generic specification enabling execution of the at least one network function in the first operator network for providing the service to the user equipment. The service-deployment-specification and/or the generic specification may comprise a Service Function Chain (SFC) template, comprising operator-specific deployment information for an ordered set of interconnected network functions associated with the service. Yet another step is transmitting the generic specification to the first operator network. It should be appreciated that the steps may be performed in the second operator network. It may also be that one or more of the steps are performed outside of the second operator network.

Yet another aspect of the disclosure relates to a system, for example in a second operator network, that is configured to provide a service to a user equipment connected to a first operator network, wherein a second operator network comprises a register containing subscription information of the user equipment, the system comprising at least one of:

a service control node that is configured to receive from the first operator network a service request of the user equipment, the service request being associated with the service; and a service manager that is configured to obtain a service-deployment-specification for the second operator network comprising at least one network function associated with the service on the basis of the service request;

an interworking node that is configured to convert the service-deployment-specification for the second operator network into a generic specification, the generic specification enabling execution of the at least one network function in the first operator network for providing the service to the user equipment; and a transmitter that is configured to transmit the generic specification to the first operator network.

Yet another aspect of the disclosure relates to a service control node, service manager, or interworking node for use in the system.

Yet another aspect of the disclosure relates to a method for providing a service to a user equipment connected to a first operator network, wherein a second operator network comprises a register containing subscription information of the user equipment, the method comprising the steps, e.g. in the first operator network, of:

transmitting a service request of the user equipment to the second operator network, the service request being associated with the service;

receiving a generic specification comprising at least one network function associated with the service from the second operator network, the generic specification being obtained in the second operator network on the basis of the transmitted service request;

executing the at least one network function in the first operator network for providing the service to the user equipment on the basis of the generic specification.

Yet another aspect of the disclosure relates to a system in a first operator network for providing a service to a user equipment connected to a first operator network, wherein a second operator network comprises a register containing subscription information of the user equipment, the system comprising at least one of:

a transmitter that is configured to transmit a service request of the user equipment to the second operator network, the service request being associated with the service;

a receiver that is configured to receive a generic specification comprising at least one network function associated with the service from the second operator network, the generic specification being obtained in the second operator network on the basis of the transmitted service request;

a service control node that is configured to control execution of the at least one network function for providing the service to the user equipment on the basis of the generic specification.

The first operator network may further comprise a set of usable, configurable and/or programmable nodes in the first operator network that can be used for executing the at least one network function in the first operator network.

Yet another aspect of the disclosure relates to an interworking node or service control node configured for use in the system in the first operator network.

It should be appreciated that considerations below regarding features of the methods performed in the second operator network also apply to the corresponding features of the system in the second operator network.

Similarly, considerations below regarding features of the methods performed in the first operator network also apply to the corresponding features of the system in the first operator network.

The invention is based on the realization that a visited operator network is typically not configured to interpret a service request from a user equipment that has a subscription in another operator network. Hence, the service associated with such service request cannot be provided to the user equipment immediately from the first operator network. This disclosure provides a solution to this problem by transmitting the service request to the home network of the user equipment. The home network is configured to interpret the service request and obtain a service-deployment-specification defining which network functions need to be executed in order for the service to be delivered. However, since the user equipment is connected to the visited operator network, it may be desirable and/or required that some of these network functions are executed in the visited operator network. However, merely transmitting the service-deployment specification to the visited network would be purposeless, because the visited operator network is typically not configured to interpret the service-deployment-specification of the home operator network. In addition, the service-deployment-specification may comprise information which is specific for the home operator network, like e.g. Physical Network Functions and/or firewall addresses. This information may be confidential and the home network operator may not wish to share this information with other network operators. In an example the service-deployment-specification comprises detailed information on which resources at which IP addresses in the home network need to be used for performing a network function. Such information would be useless for the visited operator network and may preferably be kept private within the home network. Hence the service-deployment-specification is converted into a generic specification that enables execution, optionally after further conversion of the generic specification, of a network function in the visited operator network, after which the generic specification is transmitted to the visited operator network. The disclosure enables that a more constant user experience can be provided to a user. After all, a service may be provided to a user irrespective of whether his user equipment is connected to its home network or a visited network. Of course, it is noted that the quality of a provided service, such as a delay or throughput of a service, may very well depend on the user equipment being connected to either its home network or visited network, since the visited network may comprise different, or different amounts of, resources than the home network.

It should be appreciated that the user equipment may be any device connectable to an operator network, such as a mobile phone, tablet computer, et cetera.

The first and second operator network may comprise telecommunications networks. Furthermore, each of the first and second operator network may comprise a fixed access operator network and/or a mobile operator network, such as a 3G, 4G or 5G network.

It should be appreciated that a node in the first operator network may receive a service request. The service request may be generated by the user equipment and/or transmitted, e.g. unicast or anycast, by the user equipment to the node in the first operator network. It should be appreciated that the service request may comprise both information that is interpretable and/or can be manipulated by the node in the first operator network and information that is interpretable by a node in the second operator network. In an example the node in the first operator network adds information relating to the first operator network, based on which node in the second operator network is able to route the generic specification to the first operator network. In another example the service request is encrypted so that only nodes in the second operator network can process the service request.

It should be appreciated that the service request may be routed from the node in the first operator network to the service control node in the second operator network.

The service request may comprise various information, such as the address of the node in the first operator network, wherein the address may have been obtained by the user equipment via a Domain Name Server (DNS). The service request may also comprise a verifiable identifier, e.g. the IMSI or MSISDN, and/or an indication of the second operator network, such as a destination IP address of the service control node in the second operator network, based on which a node in the first operator network can transmit the service request to the second operator network.

It should be appreciated that the first and second operator network may be connected over an internet connection. This may be a secure connection, e.g. a VPN. The internet connection may be used for all communication between the first and second operator network.

The method may further comprise authenticating the user equipment based on the verifiable identifier and verifying that the user equipment is authorized for the requested service. The method may further comprise authenticating a node of the first operator network from which the service request was received in the second operator network.

The service-deployment-specification may specify an ordered set of interconnected network functions associated with the service. The service-deployment-specification may specify how these interconnected network functions are related, for example how traffic should be routed between them.

It is noted that the generic specification may be in any format, for example a standardized format by IETF or ETSI NFV, but could also be a de-facto standard format, or a non-standardized format upon which two or more operators have agreed on using.

It should further be appreciated that executing a network function in the first operator network for providing the service may comprise instantiating the network function in the first operator network and/or using the instantiated network function for providing the service.

It should be appreciated that one or more of the service control node, interworking node, transmitter and service manager in the second operator network may be integrated into a single device in the second operator network. For example, the interworking node and the transmitter may be integrated into a single device or the service control node and the interworking node may be integrated into a single device. Similarly, it should be appreciated that one or more of the transmitter, receiver, service control node and interworking node in the first operator network may also be integrated into a single device in the first operator network. For example, the service control node and the transmitter may be integrated into a single device.

It should be appreciated that the interworking node of the first operator network may be located in the first operator network, but also outside of the first operator network, e.g. in a network of a third party. Similarly the interworking node of the second operator network may be located in the second operator network, but also outside of the second operator network, e.g. in a network of a third party. In addition, it is noted that the interworking node of the first operator network and the interworking node of the second operator network may be integrated into one system.

The methods may further comprise informing the user equipment that the requested service is ready for usage.

In one embodiment converting the service-deployment-specification comprises amending a syntax and/or contents of the service-deployment-specification, wherein amending the contents optionally comprises at least one of:

amending a semantics of the service-deployment-specification; and removing from the service-deployment-specification information associated with the second operator network.

The information associated with the second operator network may include indications of Physical Network Functions (PNF) and/or private information of the second operator network. Private information may comprise firewall addresses, gateway addresses, IP addresses or port number of certain network functions. It should be appreciated that the information associated with the second operator may be useless to the first operator network and/or may be information that the operator of the second operator network wishes to keep confidential.

Amending the semantics may comprise abstracting general requirements for the network function from the service-deployment-specification. An example of abstraction of required resources is that the service-deployment-specification for the second operator network may specify four concrete locations in the second operator network to assign memory to, while in the generic specification, only the total amount of required memory for the network function may be specified.

In one embodiment the service-deployment-specification comprises at least one further network function associated with the service, the method further comprising:

excluding the at least one further network function from the generic specification;

executing the at least one further network function in the second operator network for providing the service to the user equipment on the basis of the service-deployment-specification for the second operator network.

It should be appreciated that this embodiment may further comprise determining that the at least one further network function is to be executed in the second operator network for providing the service to the user equipment. It should further be appreciated that excluding the at least one further network function may be performed by excluding the at least one further network function from the service-deployment-specification prior to converting the service-deployment-specification, for example in the service control node of the second operator network. Excluding the at least one further network function from the generic specification may also be performed in the step of converting the service-deployment-specification.

This embodiment enables that a service can be partially deployed in the first operator network, and partially in the second operator network. The embodiment is for example beneficial for edge computing, because then content that is not needed at the edge can be stored in the second operator network. The embodiment is also advantageous in case the at least one further network function processes confidential data. It may also be that there are no strict performance reasons to execute the at least one further network function in the first operator network. It might be more expensive to execute the at least one further network function in the first operator network.

In one embodiment the method comprises verifying whether the at least one further network function is instantiated in the second operator network;

when the at least one further network function is instantiated in the second operator network, using the instantiated at least one further network function for providing the service to the user equipment on the basis of the service-deployment-specification for the second operator network;

when the at least one further network function is not instantiated in the second operator network, instantiating the at least one further network function in the second operator network for providing the service to the user equipment on the basis of the service-deployment-specification for the second operator network.

It should be appreciated that the service-deployment-specification for the second operator network may not be converted into a generic specification, or the generic specification may not be transmitted to the first operator network, before the second network function is instantiated in the second operator network. The embodiment enables that the second operator network can efficiently use its resources because the at least one further network function need not be already instantiated in the second operator network, but may be instantiated in response to and based on the service-deployment-specification for the second operator network.

In one embodiment the service relates to a further user equipment connected to a further operator network, the method further comprising:

converting the service-deployment-specification for the second operator network into a further generic specification, the further generic specification enabling execution of the at least one network function in the further operator network for providing the service to the further user equipment;

transmitting the further generic specification to the further operator network.

This embodiment enables that the service may be provided to multiple user equipment devices connected to different operator networks. The service may comprise a multi-user service, such as group video conferencing, voice conferencing or gaming. It should be appreciated that the register in the second operator network may contain subscription information of the further user equipment.

In one embodiment the service control node of the second operator network comprises:

a receiver that is configured to receive from the first operator network a service request of the user equipment, the service request being associated with the service;

processing means that are configured to obtain a service-deployment-specification for the second operator network comprising at least one network function associated with the service on the basis of the service request;

a transmitter that is configured to transmit the service-deployment-specification for the second operator network to an interworking function of the second operator network that is configured to convert the service-deployment-specification for the second operator network into a generic specification, the generic specification enabling execution of the at least one network function in the first operator network for providing the service to the user equipment.

In one embodiment of the service control node of the second operator network the service-deployment-specification comprises at least one further network function associated with the service, and the processing means are further configured to:

determine that the at least one further network function is to be executed in the second operator network for providing the service to the user equipment; and to execute the at least one further network function in the second operator network for providing the service to the user equipment. The processing means may further be configured to exclude the at least one further network function from the service-deployment-specification.

This embodiment enables that a service can be partially deployed in the first operator network, and partially in the second operator network. The embodiment is for example beneficial for edge computing. The embodiment is also advantageous in case the at least one further network function processes confidential data. It may also be that there are no strict performance reasons to execute the at least one further network function in the first operator network. It might be more expensive to execute the at least one further network function in the first operator network.

In one embodiment the processing means of the service control node of the second operator network are further configured to:

verify whether the at least one further network function is instantiated in the second operator network;

when the at least one further network function is instantiated in the second operator network, use the instantiated at least one further network function for providing the service to the user equipment on the basis of the service-deployment-specification for the second operator network;

when the at least one further network function is not instantiated in the second operator network, instantiate the at least one further network function in the second operator network for providing the service to the user equipment on the basis of the service-deployment-specification for the second operator network.

It should be appreciated that the service-deployment-specification for the second operator network may not be converted into a generic specification, or the generic specification may not be transmitted to the first operator network, before the second network function is instantiated in the second operator network. The embodiment enables that the second operator network can efficiently use its resources because the at least one further network function need not be already instantiated in the second operator network, but may be instantiated in response to and based on the service-deployment-specification for the second operator network.

In one embodiment the interworking node of the second operator network comprises:

a receiver that is configured to receive from a service control node of the second operator network a service-deployment-specification for the second operator network comprising at least one network function associated with the service;

processing means that are configured to convert the service-deployment-specification for the second operator network into a generic specification, the generic specification enabling execution of the at least one network function in the first operator network for providing the service to the user equipment;

a transmitter that is configured to transmit the generic specification for the first operator network.

In one embodiment of the interworking node of the second operator network the processing means are configured to convert the service-deployment-specification for the second network by amending a syntax and/or contents of the service-deployment-specification, wherein amending the contents optionally comprises at least one of:

amending a semantics of the service-deployment-specification for the second network; and removing from the service-deployment-specification for the second operator network information associated with the second operator network.

In one embodiment the method in the first operator network comprises:

converting the generic specification into a service-deployment-specification for the first operator network;

executing the at least one network function in the first operator network for providing the service to the user equipment on the basis of the service-deployment-specification for the first operator network.

This embodiment enables that the generic specification need not directly enable the first operator network to execute the at least one network function and that an extra conversion step may be performed. It should be appreciated that in this embodiment the execution of the at least one network function is executed on the basis of the generic specification, because the service-deployment-specification for the first operator network is based on the generic specification.

In one embodiment in the method in the first operator network converting the generic specification comprises amending a syntax and/or contents of the generic specification, wherein amending the contents optionally comprises at least one of:

amending a semantics of the generic specification; and adding to the generic specification information associated with the first operator network. This embodiment enables that the generic specification need not comprise information associated with the first operator network.

In one embodiment the method in the first operator network comprises:

verifying whether the at least one network function is instantiated in the first operator network;

when the at least one network function is instantiated in the first operator network, using the instantiated at least one network function for providing the service to the user equipment;

when the at least one network function is not instantiated in the first operator network, instantiating the at least one network function in the first operator network for providing the service to the user equipment.

The embodiment enables that the first operator network can efficiently use its resources because the at least one operator network function need not be already instantiated in the first operator network, but may be instantiated in response to and based on the generic specification or the service-deployment-specification for the first operator network.

In one embodiment the interworking node of the first operator network comprises:

a receiver that is configured to receive a generic specification comprising at least one network function associated with the service from the second operator network, the generic specification being obtained in the second operator network on the basis of the transmitted service request;

processing means that are configured to convert the generic specification into a service-deployment-specification for the first operator network;

a transmitter that is configured to transmit the generic specification to a service control node of the first operator network.

In one embodiment of the interworking node of the first operator network, the processing means are configured to convert the generic specification by amending a syntax and/or contents of the generic specification, wherein amending the contents optionally comprises at least one of:

amending a semantics of the generic specification; and adding to the generic specification information associated with the first operator network.

This embodiment enables that the generic specification need not comprise information associated with the first operator network.

Yet another aspect of the disclosure relates to a computer program or suite of computer programs comprising at least one software code portion or a computer program product storing at least one software code portion, the software code portion, when run on a computer system, being configured for executing one or more of the methods described above.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems, such as service control nodes, interworking nodes, and service manager, or be stored upon manufacturing of these systems.

Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1A:
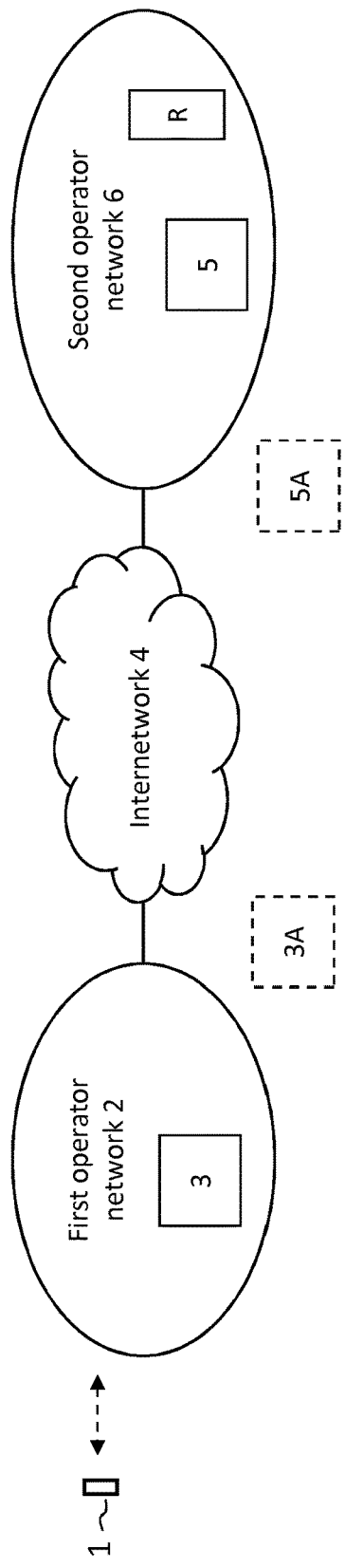
FIGS. 1A and 1B show an embodiment of the invention.

FIG. 1A schematically shows an embodiment. User equipment 1 is connected to first operator network 2. It should be appreciated that user equipment 1 can be connected to the first operator network 2 in various ways. The user equipment 1 may be connected to a base station of first operator network 2, but may also be connected to the first operator network through a WiFi access point, or through a fixed access operator network. The second operator network 6 comprises a register R that contains subscription information of the user equipment 1. The user of user equipment 1 may have a contract with the operator of the second operator network, which may entitle the user to use certain services. Information regarding this contract, or regarding the services to which the user is entitled, is probably not available in the first operator network 2. Moreover, the services are probably not by default available to visiting users. Hence providing these services to the user is not trivial. Both the first operator network 2 and the second operator network 6 are connected to an internetwork 4, such as the internet. The internet may be conveniently used for best effort delivery of services. However, if services are associated with certain quality of service requirements, other types of internetwork 4 may be more suitable. The internetwork 4 may be used for all communication between the first and second operator network. Also shown is system 3 in the first operator network 2 and system 5 in the second operator network 6. These systems have been described above and are configured to provide a service to user equipment 1. It should be appreciated that the systems may also be (partially) located outside of the first and second operator network as indicated by system 3A and system 5A respectively.

Figure 1B:
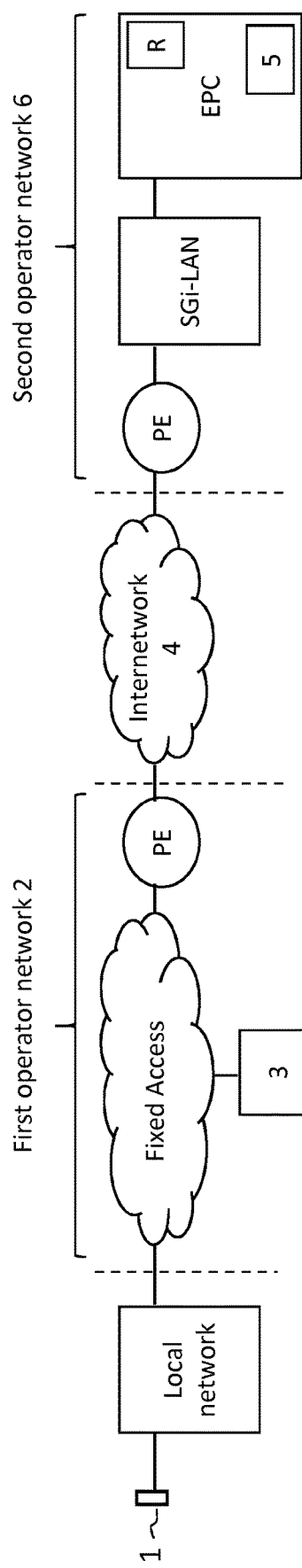

FIG. 1B shows an embodiment in more detail. Herein the first operator network 2 is a fixed access operator network, while the second operator network 6 is a mobile operator network. It should be appreciated that alternatively both the first and second operator networks are fixed access operator networks, or that both are mobile operator networks, or that the first operator network 2 is a mobile operator network and that the second operator network is a fixed access operator network. Also shown are Provider Edge routers, indicated with PE, through which the first and second operator network connect with the internetwork 4. System 3 is connected to the fixed access operator network and system 5 sits in the Evolved Packet Core (EPC) of the second operator network.

Figure 2:
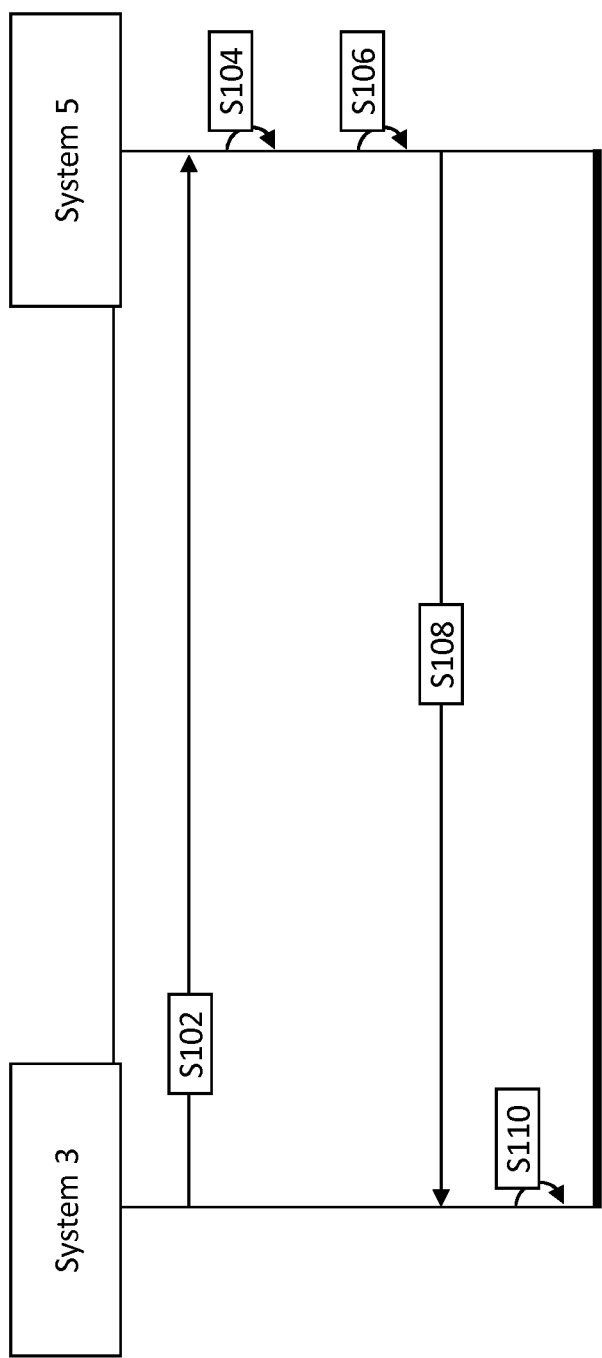
FIG. 2 is a time diagram illustrating an embodiment.

FIG. 2 shows a time diagram illustrating a method for providing a service to user equipment 1 according to an embodiment of the invention. In step S102, the system 3 in the first operator network 2 transmits a message comprising a service request of the user equipment 1 to the system 5 in the second operator network 6 and the system 5 receives the message comprising the service request from system 3. System 3 may transmit the message to system 5 on the basis of information that may be present in a header of the message, while the service request itself may be present in the payload of the message. Step S104 depicts obtaining, in system 5, a service-deployment-specification for the second operator network 6, for example a Service Function Chain template. The service-deployment-specification may specify which network functions may need to be executed for delivery of the service, in which order the network functions need to be executed, which resources at which locations in the second operator network 6 need to be used to execute the network function and/or how traffic should be routed between the network functions. Examples of network functions are storage functions, routers, firewalls etcetera. In this case the service-deployment-specification comprises one network function, namely a storage function. It may be that the service-deployment-specification obtained in step S104 would enable, in a situation wherein the user equipment 1 is connected to the second operator network, execution of the storage function in the second operator network 6 and thus the delivery of the service to the user equipment 1. In the depicted situation, however, the user equipment 1 is connected to the first operator network 2. In step S106 the service-deployment-specification is converted into a generic specification, that enables execution of the network function in the first operator network 2. Subsequently, in step S108 the generic specification is transmitted from system 5 to system 3 and received in system 3 from system 5. Step S110 depicts executing the network function, i.e. the storage function, based on the generic specification. The generic specification may comprise information from which the system 3 understands, optionally after further conversion, how to execute the network function in the first operator network for providing the service to the user equipment 1.

Figure 3:
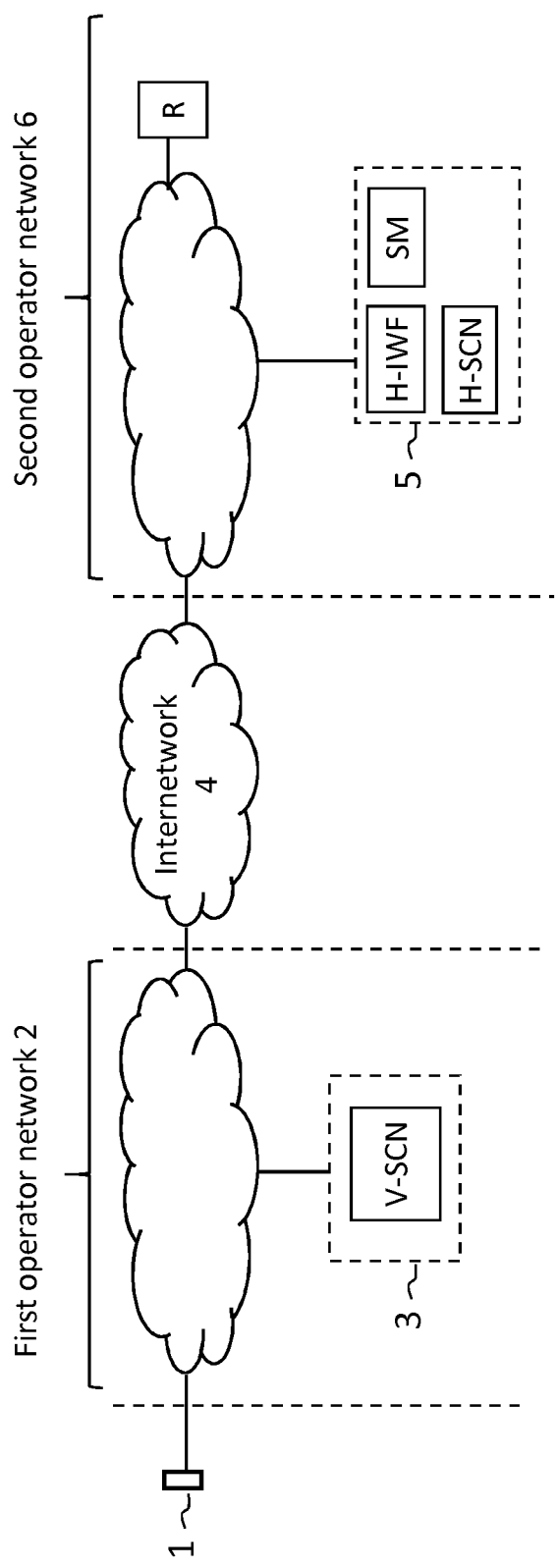
FIG. 3 shows in more detail an embodiment of the invention.

FIG. 3 schematically shows where the described nodes of the first and second operator network may be located. System 3 is located in the first operator network 2 and comprises a service control node V-SCN (Visited-Service Control Node). System 5 is located in the second operator network 6 and comprises an interworking node H-IWF (Home-Interworking Function), a service control node H-SCN (Home-Service Control Node) and a service manager SM. The service control nodes V-SCN and H-SCN may be configured for controlling on-demand service provisioning for the first respectively the second operator network. Service control nodes V-SCN and H-SCN may be configured for at least one of detecting a service request in one of the networks, authorizing a service request, determining a required network function on the basis of a service request, instantiating network functions in an operator network, routing traffic for providing services and terminating network functions instances in an operator network. In general, the service control nodes V-SCN and H-SCN may be responsible for life-cycle management of the network function instances in the first respectively the second operator network. The service manager SM is configured to obtain a service-deployment-specification for the second operator network comprising at least one network function associated with a service. The service manager SM may include an interface for communication with the service control node H-SCN and may be configured to receive a request for a service-deployment-specification over the interface from the service control node H-SCN, to retrieve the service-deployment-specification from a memory or generate the service-deployment-specification and to provide the service control node with the retrieved or generated service-deployment-specification. The service manager SM may be configured to maintain a list of known services, their configurations, and other possible information associated with each service (e.g., billing, users, policies). The service manager SM may interface with third parties delivering the services and with relevant network elements and other components to load and execute the service, such as cloud brokers, P-GWs, ENBs etc. The service control node H-SCN may be configured to dispatch a service request to the service manager SM to obtain a service-deployment-specification comprising one or more network functions for providing the service. The interworking node H-IWF is configured to convert a service-deployment-specification for the second operator network into a generic specification, wherein the generic specification enables execution of a network function in the first operator network for providing the service to the user equipment 1.

Figure 4A:
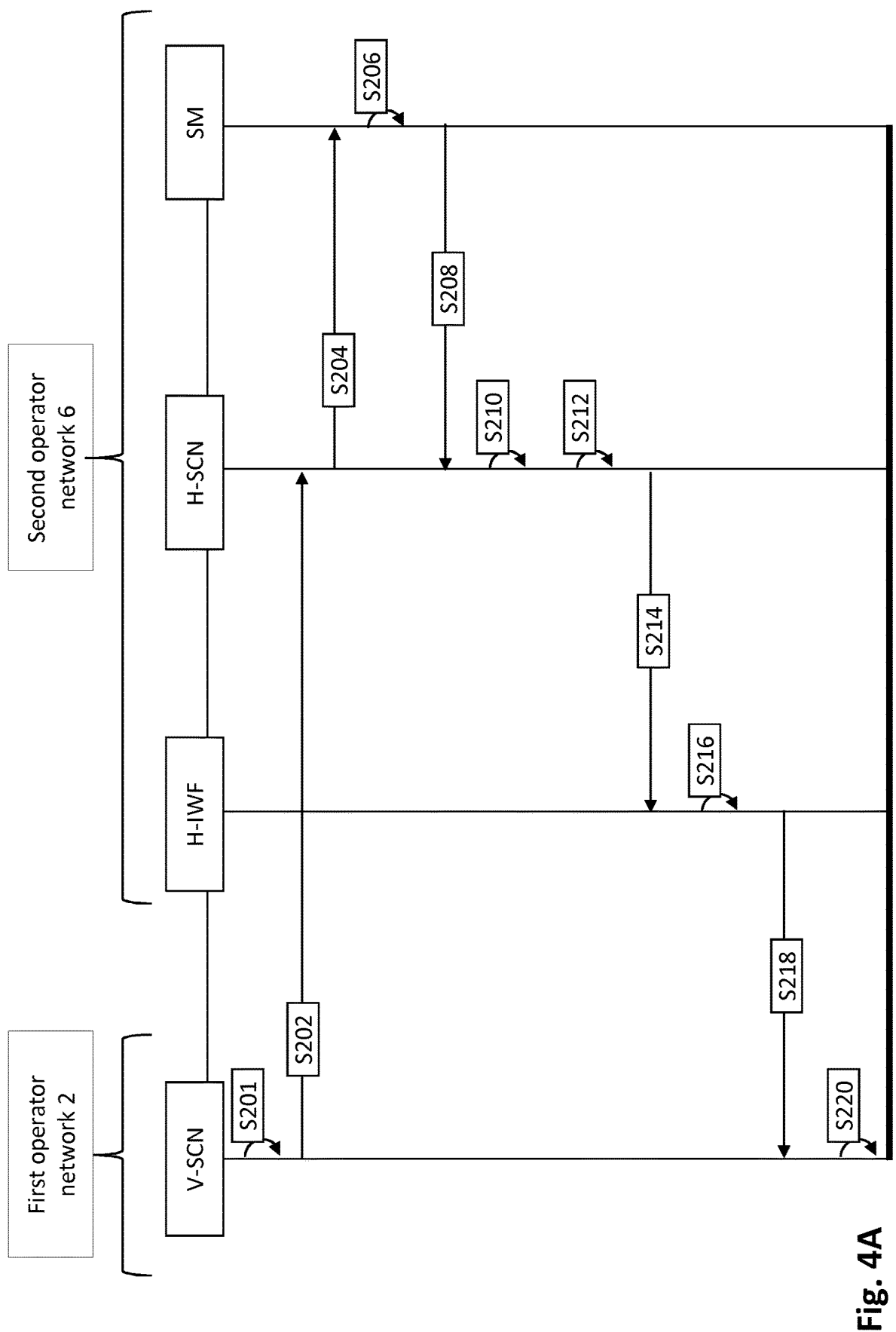
FIGS. 4A-4C illustrate embodiments wherein network functions are deployed in different operator networks.

FIG. 4A shows a time diagram illustrating a method for providing a service to a user equipment 1 according to an embodiment of the invention. The time diagram shows the messages that may be transmitted between, and processes that may occur in, specific nodes of the first operator network 2 and the second operator network 6.

In step S201 the service control node V-SCN in the first operator network detects a service request that is associated with a service. In an example the service is video streaming, i.e. the user equipment has transmitted a request that a certain video stream is transmitted to the user equipment, so that it can be presented to a user. In step S202 the service control node V-SCN in the first operator network 2 transmits the service request to service control node H-SCN in the second operator network 6. In step S202 the service control node H-SCN in the second operator network 6 receives from the service control node V-SCN in the first operator network the service request. Next, in step S204, the service control node H-SCN transmits, based on the received service request, a message to service manager SM of the second operator network. In S206 the service manager SM retrieves or creates a service-deployment-specification on the basis of the received message, and thus on the basis of the service request, and in step S208 the service control node H-SCN receives the services-deployment-specification from the service manager SM. In this example the service-deployment-specification comprises two network functions that need to be executed for providing the video stream to the user equipment. In step S210, the service control node H-SCN determines that the first of the network functions is to be executed in the first operator network and the second is to be executed in the second operator network, e.g. based on the available storage resources in the first operator network and the confidentiality of information used by the network function. The second network function may for example be an authentication function. In step S212, the service control node H-SCN ensures that the second network function is executed in the second operator network 6. Step S212 may comprise verifying whether the second network function is instantiated in the second operator network 6. When this is the case, the instantiated second network function can be used for execution of the second network function for providing the video stream. When the second network function is not instantiated in the second operator network 6, the H-SCN may instantiate the second network function. Step S212 may comprise excluding the second network function from the service-deployment-specification. In step S214 the service-deployment-specification comprising the above mentioned first network function is transmitted to the interworking node H-IWF. Step S216 depicts converting the service-deployment-specification into a generic specification and in step S218 a transmitter in the interworking node H-IWF transmits the generic specification to the service control node V-SCN in the first operator network 2. In step S218 the service control node V-SCN in the first operator network receives from the interworking node H-IWF the generic specification. In step S220, the service control node V-SCN executes the first network function in the first operator network 2. It should be appreciated that step S220 may be similar to step S212 performed in the second operator network 6 and may thus also comprise verifying whether the first network function is instantiated in the first operator network and using the instantiated first network function or instantiating the first network function. It should be appreciated that both the service-deployment-specification and the generic specification may comprise information regarding how the service can be provided to the user with the two network functions being executed in different operator networks, for example information regarding which connections between the first and second operator network need to be used.

Figure 4B:
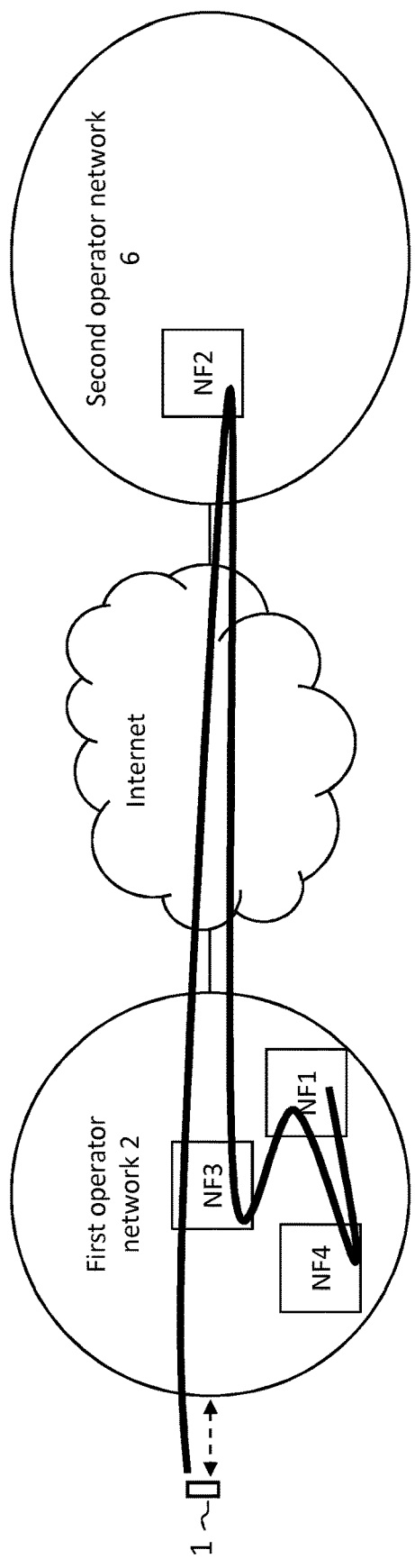
Figure 4C:
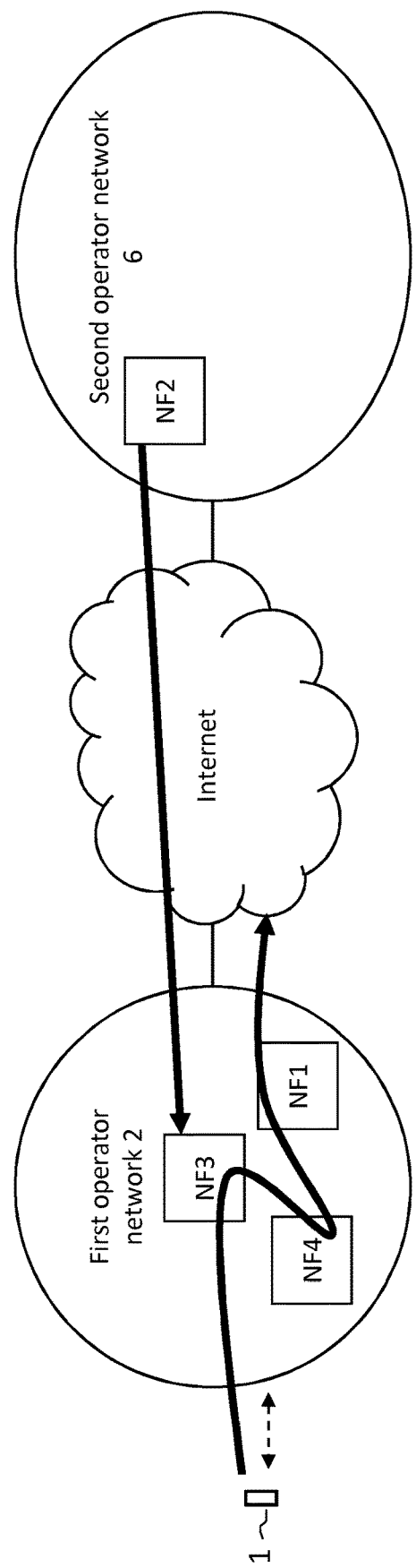

FIGS. 4B and 4C schematically show results of embodiments wherein at least one network function, NF2 in this case, is executed in the second operator network 6 as was the case in the method described above with reference to FIG. 4A.

Network function NF2 is executed in the second operator network and network functions NF1, NF3 and NF4 are executed in the first operator network. This case is valid, since a network operator could have the preference to have certain network functions under its own control/in its own operator network. One reason behind this is that network functions may process confidential data. It may also be that there are no strict performance reasons for the network functions to be executed in the first operator network and it might be more expensive to place a network function in the first operator network when compared to executing the network function in the second operator network. Another reason might be in the case of edge computing/content delivery, where user-relevant content is distributed to the edge in the first operator network, but the main content server from which the content is originating still resides in the second operator network.

FIG. 4B shows the case where NF2 is e.g. a security function, e.g. an authentication function or some deep packet inspection function. Note that in this case the Internet has to be traversed, so either the service has no strict latency requirements, but does have security constraints (e.g. a VPN service to a secure domain), or the function is only used in the control plane, and not in the data plane (e.g. to authenticate before starting a video stream).

FIG. 4C shows an edge computing/content distribution case. The user of the user equipment 1 wants to access content that requires low latency (e.g. gaming), so it needs to have the content close by e.g. in NF1. However not all content of network function NF2 may be streamed to the edge, only the content that the user actually needs may be streamed. Network function NF2 in this case may be a central content server in the second operator network that will distribute only user-relevant content (e.g. a selected game or stream) to network function NF1, the edge content server.

Figure 5:
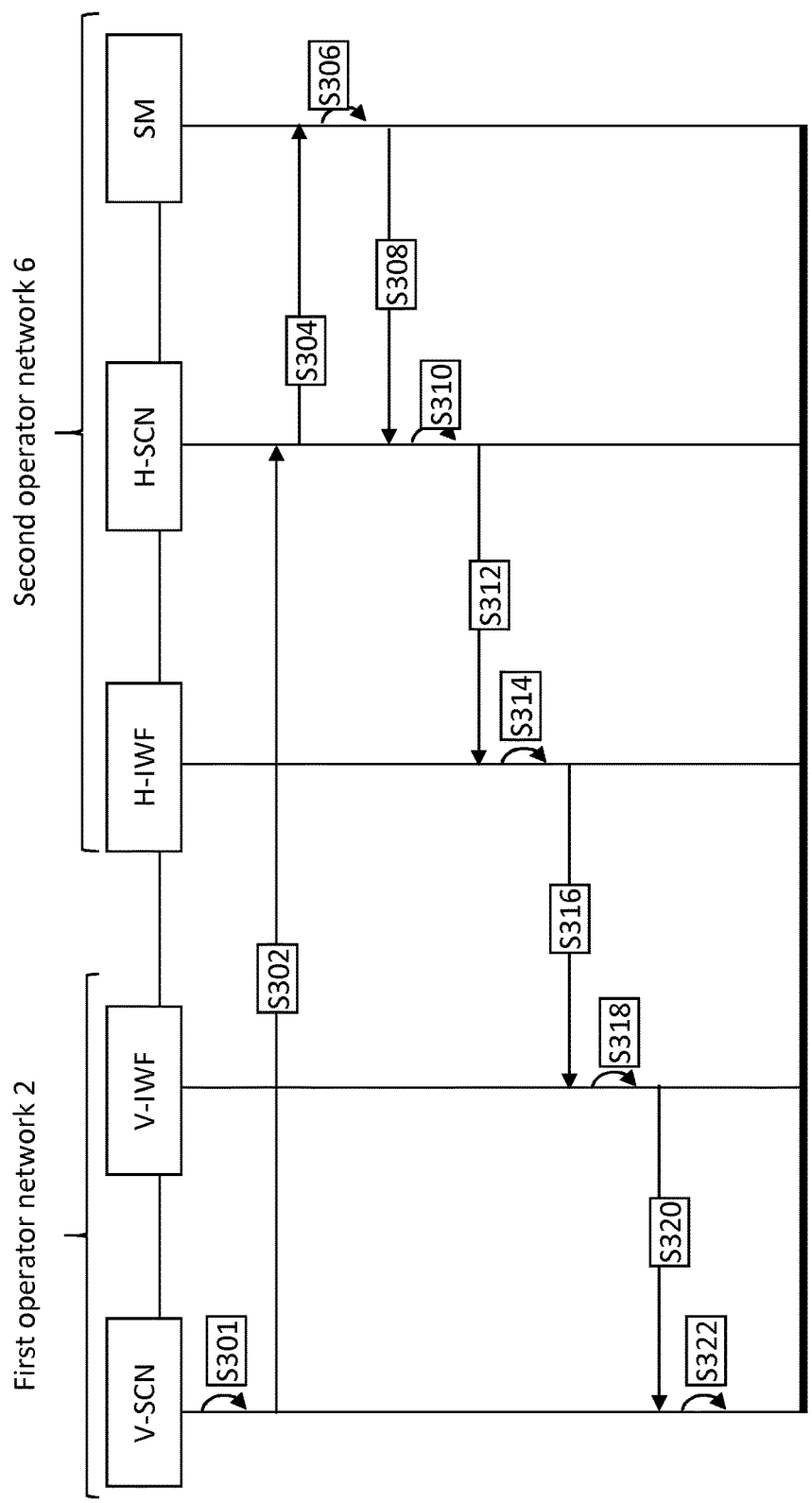
FIG. 5 is a time diagram illustrating an embodiment with two interworking nodes.

FIG. 5 is a time diagram illustrating a method for providing a service to the user equipment 1. Note that the first operator network 2 comprises the service control node V-SCN and interworking node V-IWF. It should be appreciated that the interworking node V-IWF may be comprised in system 3 depicted in FIG. 3. The second operator network 6 comprises interworking node H-IWF, service control node H-SCN and service manager SM. Steps S301, S302 and S304 correspond respectively to steps S201, S202 and S204 described above. In this example, in step 306 the service manager SM retrieves from a memory a service-deployment-specification that comprises, for the sake of simplicity, one network function. In step S308 the service control node H-SCN receives from the service manager SM the service-deployment-specification and determines in step S310 that the network function in the service-deployment-specification is to be executed in the first operator network 2. Therefore, in step S312 the service control node H-SCN transmits the service-deployment-specification to the interworking node H-IWF and in step S312 the interworking node H-IWF receives from H-SCN the service-deployment-specification. In step S314 the interworking node H-IWF converts the service deployment specification into a generic specification. Next, in step S316 the H-IWF transmits the generic specification to the interworking node V-IWF in the first operator network and in step S316 the interworking node V-IWF in the first operator network receives from interworking node H-IWF the generic specification. In step S318, the interworking node V-IWF converts the generic specification into a service-deployment-specification for the first operator network 2. It should be appreciated that the service-deployment-specification for the first operator network comprises the network function that was obtained by service manager SM in the second operator network 6. Subsequently, in step S320 the interworking node V-IWF transmits the service-deployment-specification for the first operator network to service control node V-SCN, which in step S322 executes the network function on the basis of the service-deployment-specification for the first operator network, so that the service may be provided to the user equipment.

Figure 6:
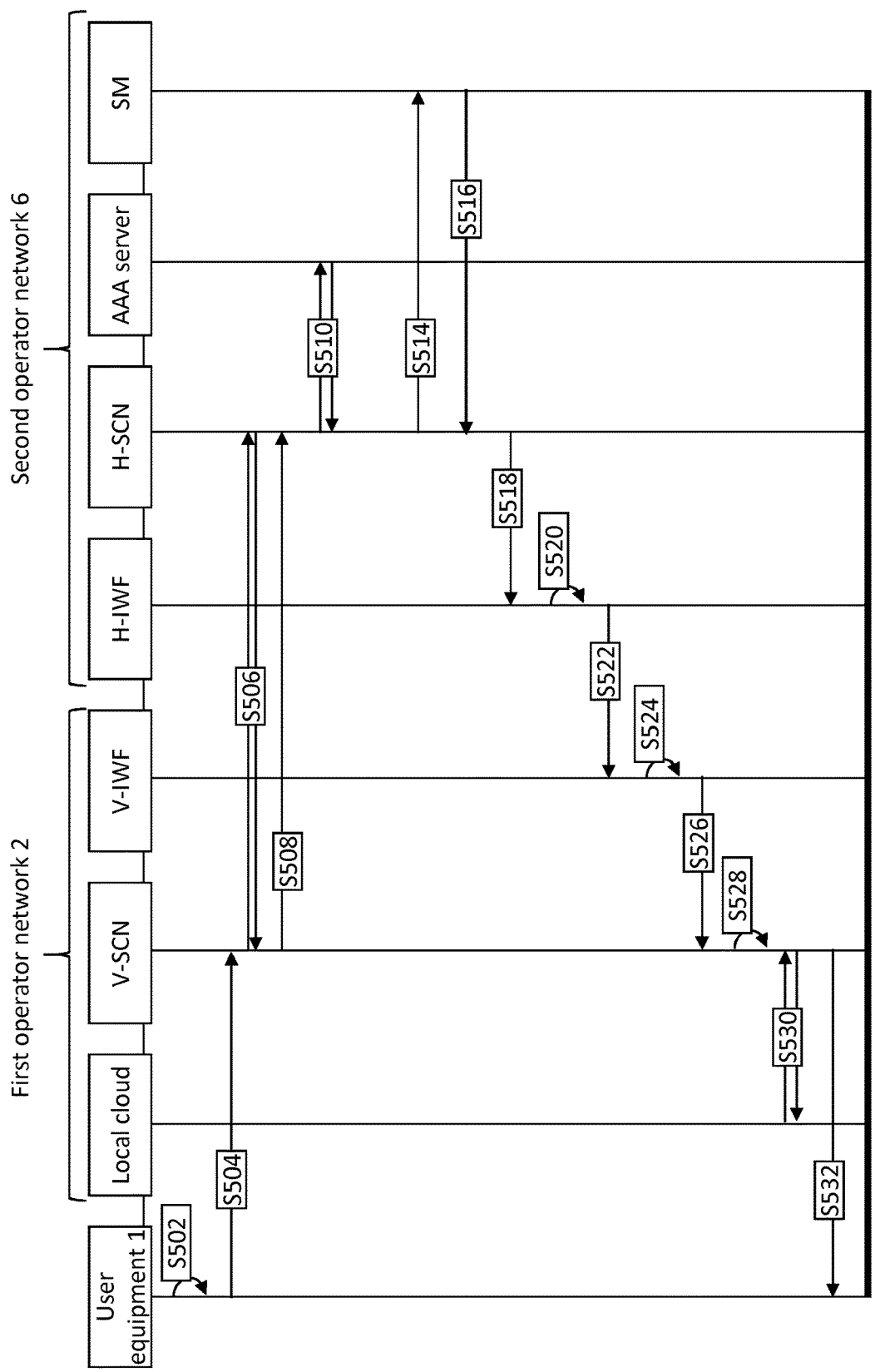
FIG. 6 is a detailed time diagram illustrating a method according to an embodiment.

FIG. 6 is a time diagram illustrating a method for providing a service to user equipment 1. The user equipment 1 generates in step S502 a message comprising a header and a payload, the payload comprising a service request. In step S504 the message is received at service control node V-SCN. The header of the message comprises the network location of the service control node V-SCN, that was obtained e.g. via DNS or an active or passive discovery mechanism. User equipment 1 may also use an anycast approach to find the nearest service control node V-SCN. The message also comprises a verifiable identity that the service control node V-SCN can use in the authentication procedure, e.g. the IMSI or MSISDN. The message may further comprise a descriptor of the requested service, such as service type, and/or an identifier of the second operator network, such that the service control node V-SCN can locate the service control node H-SCN in the second operator network 6. Note that the service request only needs to be understood by the second operator network, so it could be encrypted or in a format that is not understood by the service control node V-SCN.

Then, in step S506 a secure connection is setup between service control nodes V-SCN and H-SCN, in which the V-SCN needs to be trusted by the H-SCN. This will result in a secure connection, e.g. a VPN, between the first and second operator networks. This connection may now be used for all further communication between the first and second operator network.

After that, in step S508 service control node V-SCN forwards the service request, or the message comprising the service request, to service control node H-SCN and service control node H-SCN receives in step S508 the service request from service control node V-SCN. Service control node H-SCN then uses in step S510 the verifiable identity to authenticate the user and the service request to determine if the user is actually authorized for using the requested service. Service control node H-SCN contacts in step S510 an AAA server of the second operator network (e.g. an HSS or RADIUS server) to verify the authenticity of service control node V-SCN and the authenticity of the user and authorization of the user for the requested service. It should be appreciated that service control node H-SCN may contact more than one AAA server for the authentication procedure. If the user cannot be authenticated and/or the user is not authorized for the requested service, service control node V-SCN may be informed of this by service control node H-SCN and service control node V-SCN will deny the user equipment 1 access to the service (not shown).

In this example authentication and authorization are successful in step S510, and in step S514 service control node H-SCN requests the service-deployment-specification for the second operator network from a service manager SM and the service-deployment-specification is received from service manager SM in step S516. It should be appreciated that the H-SCN may obtain the service-deployment-specification in various ways, for example with methods described in European patent application no 14200309.4.

After service control node H-SCN has obtained the service-deployment-specification for the second operator network, it forwards in step S518 the specification to interworking node H-IWF. This H-IWF will then convert in step S520 the service-deployment-specification for the second operator network into a generic specification. During this conversion step, interworking node H-IWF may remove configurations related to the second operator network, confidential data and may abstract the required functionality, resources and performance requirements. Also, interworking node H-IWF may transform possibly different semantics into a generic format.

In step S522, the H-IWF sends the generic specification to interworking node V-IWF in the first operator network. Interworking node V-IWF converts in step S524 the generic specification into a service-deployment-specification for the first operator network. When this is done, interworking node V-IWF sends in step S526 the service-deployment-specification for the first operator network to service control node V-SCN.

In this example, after service control node V-SCN has received service-deployment-specification for the first operator network it will initiate in step S528 an instantiation process of the service-deployment-specification in the first operator network. This may be done in multiple ways, for example by connecting to a local cloud in step S530. Amongst others the methods described in European patent application no 14200309.4 could be used. At some point service control node V-SCN knows that network functions were successfully instantiated. After this, service control node V-SCN informs the user equipment 1 that the requested service is ready for usage in step S532.

Figure 7:
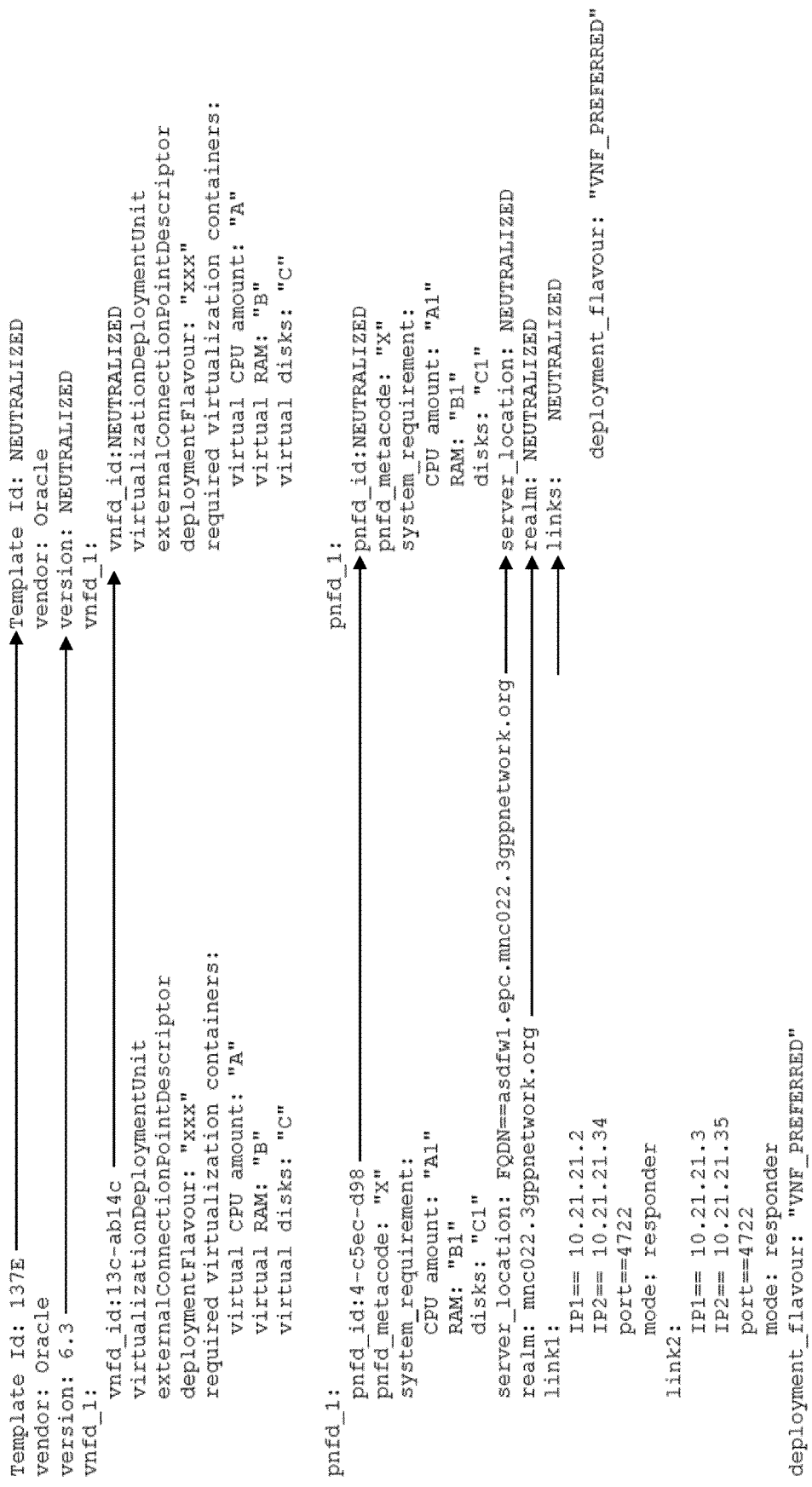
FIG. 7 illustrates a conversion into a generic specification according to an embodiment.

FIG. 7 shows an example of how the service-deployment-specification for the second operator network may be converted into a generic specification by the interworking node H-IWF. On the left the specification for the second operator network is shown, on the right the generic specification. The arrows highlight where the generic specification differs from the specification for the second operator network. The specification on the left comprises information that is associated with the second operator network. The template id, 137E, is an identification that is used in the second operator network. The version of Oracle, 6.3, is the version that runs in the second network. Another example of information associated with the second network are the links provided on the bottom of the service-deployment-specification. These comprise addresses in the second operator network that are not useful to the first operator network and that the operator of the second operator network wishes to keep private. Other examples of such information (not shown) are hardcoded locations of physical network functions, or specific information that exposes some internals of the second network provider, such as specific locations of firewalls, important databases or AAA servers in the second network. The information indicated by the arrows is neutralized in the generic specification.

A further example of amending the contents of the specification for the second network comprises amending a semantics of the specification (not shown). Abstraction of information is an example of amending the semantics. Suppose that the service-deployment-specification for the second operator network specifies two locations in the second operator network to assign memory to for executing network functions for the requested service. For example 200 MB to a resource at location A and 500 MB to a resource at location B. The generic specification may comprise only that a total of 700 MB memory needs to be assigned for executing network functions. Hence the total required amount of memory is abstracted from the service-deployment-specification for the second operator network.

Another example of amending the semantics of a specification is adding performance requirements. The performance requirements may be obtained on the basis of the specification for the second operator network. In the above example, the resources at locations A and B may be associated with certain performance characteristics. The performance requirements may be added to the generic specification based on these performance characteristics. If the resources at locations A and B are associated with a specific bit rate, this bit rate may be added to the generic specification. However, performance characteristics or performance requirements may not be explicitly present in the service-deployment-specification for the second operator network. Therefore, the interworking node H-IWF may comprise information regarding the performance characteristics of resources in the second operator network so that it is able to obtain, based on the resources specified in the service-deployment-specification, the corresponding performance characteristics and performance requirements and add these to the generic specification.

Converting the specification for the second network into a generic specification may also comprise amending a syntax (not shown).

It should be appreciated that similar steps as above may be performed in converting a generic specification into a service-deployment-specification for the first operator network. Examples are adding information associated with the first operator network, such as addresses of resources in the first operator network. It should be appreciated that the interworking node V-IWF may select resources in the first operator network based on performance requirements in the generic specification. To this end, interworking node V-IWF may comprise information regarding performance characteristics of resources in the first operator network.

Figure 8:
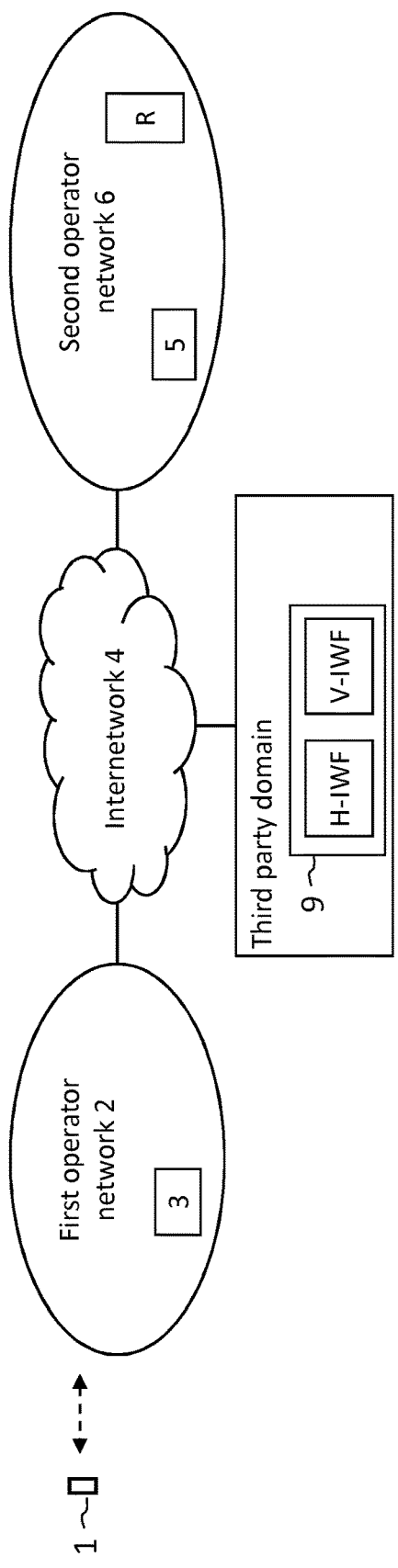
FIG. 8 depicts an embodiment wherein interworking nodes are located outside the first and second operator networks.

FIG. 8 shows a possible implementation for the interworking nodes H-IWF and V-IWF. It may be that at least one of the interworking nodes H-IWF and V-IWF are located in a domain of a third party, e.g. a secure domain connected to internetwork 4. In FIG. 8 both the interworking nodes H-IWF and V-IWF are integrated into one system 9. It should be appreciated that the methods described above may also performed in situations wherein at least one of the interworking nodes H-IWF and V-IWF is implemented in a third party domain, such as the implementation depicted in FIG. 8.

Figure 9:
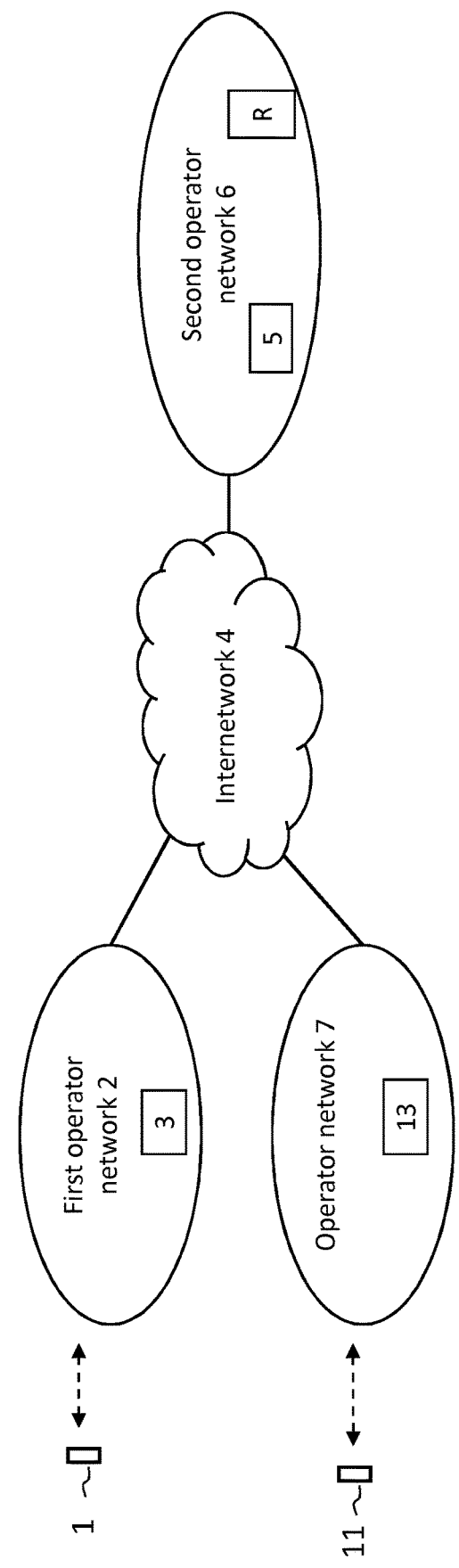
FIG. 9 depicts an embodiment with a further user equipment connected to a further operator network.

FIG. 9 shows a situation wherein a further user equipment 11 is connected to a further operator network 7. A requested service may relate to both the user equipment 1 and to the further user equipment. Examples of such services are conference calling, gaming et cetera. The generic specification may then be also transmitted to operator network 7. Operator network 7 may comprise a system 13 comprising a service control node and/or interworking node with similar functionalities as service control node V-SCN and interworking node V-IWF in the first operator network.

Figure 10:
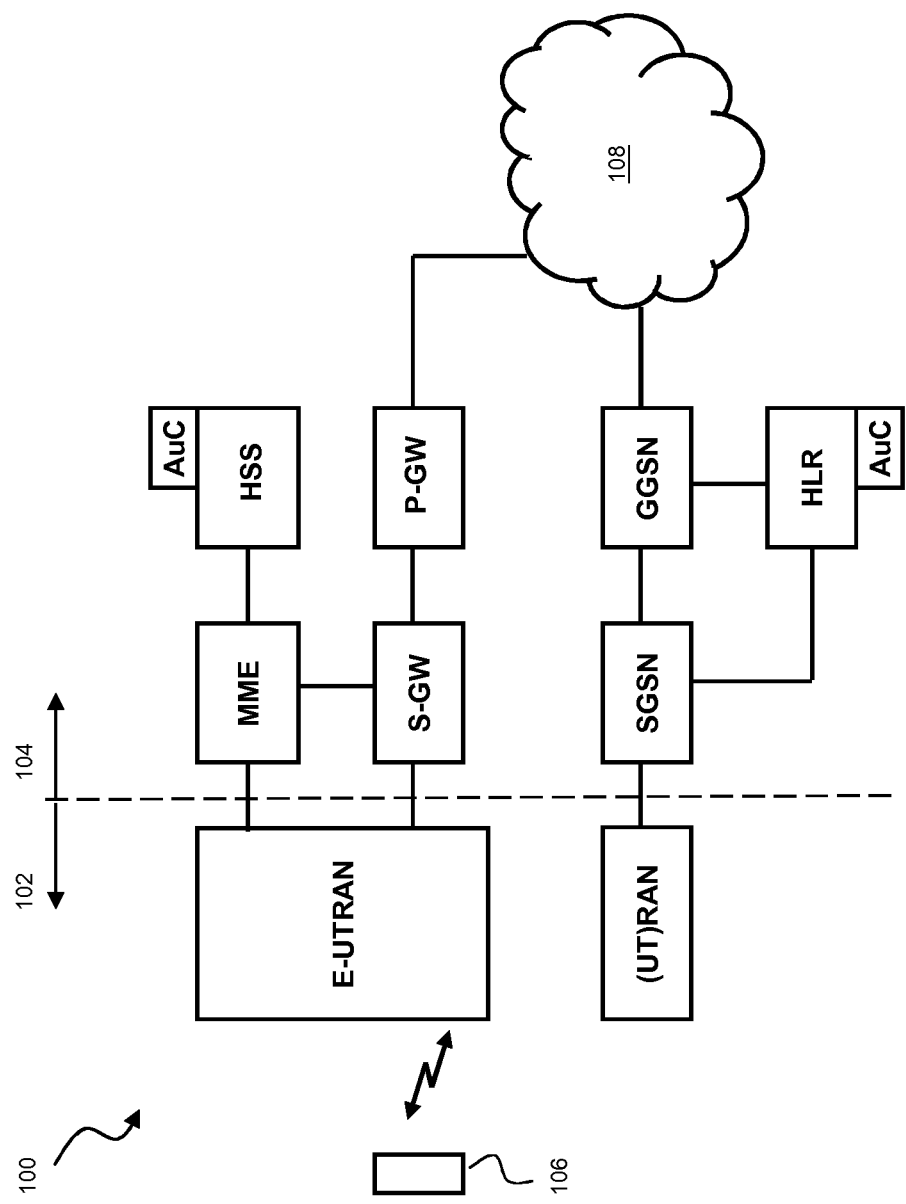
FIG. 10 shows a schematic illustration of a telecommunications system.

FIG. 10 shows a schematic illustration of a mobile operator telecommunications system 100. The telecommunications system 100 comprises a radio access network 102 (also indicated as E-UTRAN or (UT)RAN in FIG. 10) and a core network 104 containing various elements or nodes as described in further detail below.

In the telecommunications system of FIG. 10, three generations of networks are schematically depicted together for purposes of brevity. A more detailed description of the architecture and overview can be found in 3GPP TS 23.002 which is included in the present application by reference in its entirety.

The lower branch of FIG. 10 represents a GPRS or UMTS telecommunications network.

For a GSM/GPRS telecommunications network (i.e., a 2G/2.5G telecommunications network), a radio access network 102 comprises a plurality of base stations (BTSs) and one or more Base Station Controllers (BSCs), not shown individually in FIG. 10. The core network 104 comprises a Gateway GPRS Support Node (GGSN), a Serving GPRS Support Node (SGSN, for GPRS or Mobile Switching Centre (MSC, for GSM, not shown in FIG. 10), and a Home Location Register (HLR) combined with an Authentication Centre (AuC). The HLR contains subscription information for mobile devices 106 (sometimes referred to as "user equipment" (UE) or user devices) and the AuC contains a shared secret key K to be used for authentication and key agreement (AKA) procedures.

For a UMTS radio access network (UTRAN) (i.e., a 3G telecommunications network), the radio access network 102 comprises a Radio Network Controller (RNC) connected to a plurality of NodeBs, also not shown. In the core network 104, the GGSN and the SGSN/MSC are conventionally connected to the HLR/AuC that contains subscription information and shared secret keys K of the mobile devices 106.

The upper branch in FIG. 10 represents a Long Term Evolution (LTE) system or Evolved Packet System (EPS) (i.e., a 4G telecommunications network). In such a network, the radio access network 102, indicated as E-UTRAN, comprises evolved NodeBs (eNodeBs or eNBs) providing wireless access for the mobile devices 106. The core network 104 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures. Further information of the general architecture of an EPS network can be found in 3GPP TS 23.401.

For GPRS, UMTS and LTE telecommunications network, the core network 104 is generally connected, using e.g. a gateway (e.g. the P-GW), to a further network 108 which could be any external packet switched network such as e.g. Internet or a dedicated network to provide connectivity between different operators.

Of course, architectures other than defined by 3GGP, e.g. WiMAX and/or CDMA2000, can also be used within the context of the present disclosure and this does not preclude future architectures such as 5G.

FIGS. 11-15 show examples of how the service control nodes H-SCN and V-SCN, the interworking nodes H-IWF and V-IWF and the service manager SM may be located in the first or second operator network.

Figure 11:
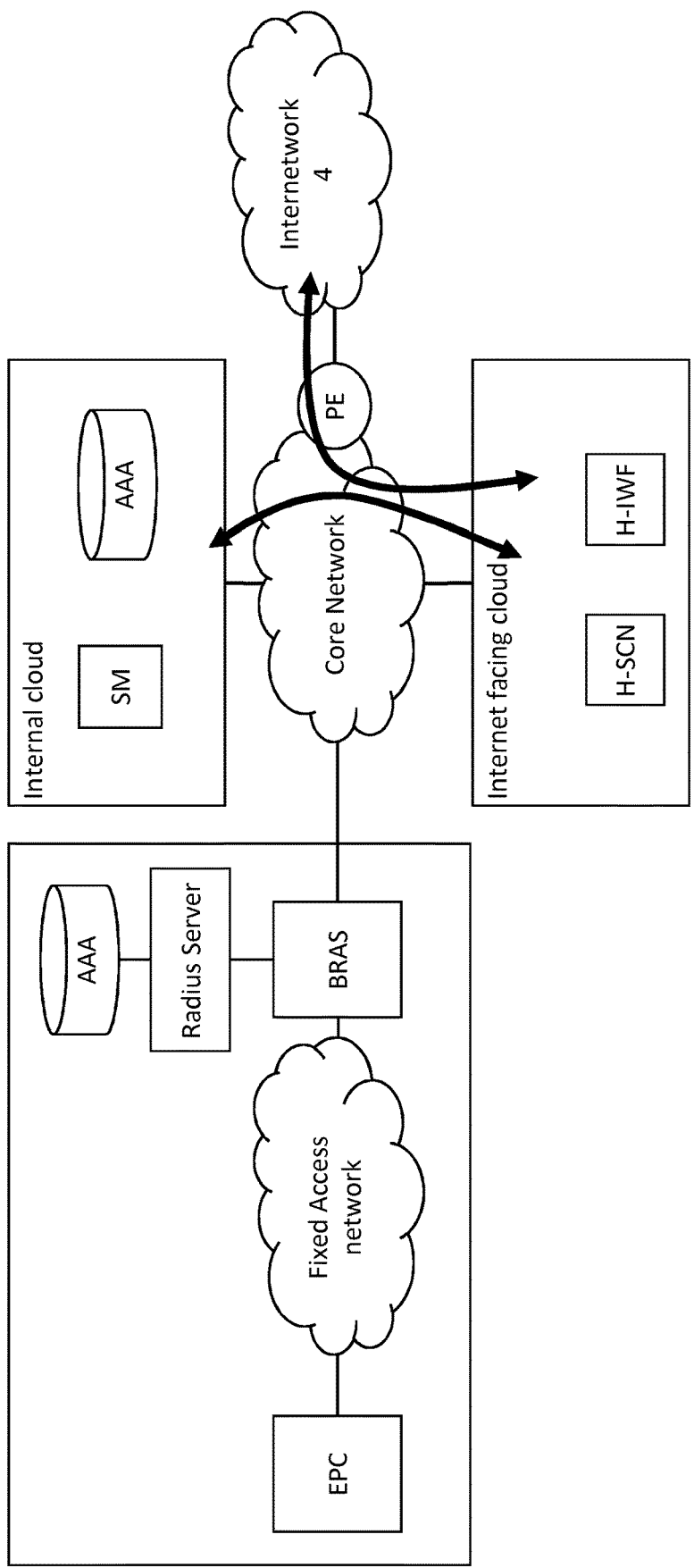
FIGS. 11-15 show possible locations of nodes according to embodiments of the invention in the first and/or second operator network.

FIG. 11 shows a possible placement of the components in the second operator network wherein the second operator network comprises a fixed access network, a core network and networks running e.g. service platforms and other functions. The fixed access network comprises for example DSL and/or Ethernet connections. The service control node H-SCN and the interworking node H-IWF are in an internetwork facing location, here an internet facing cloud. It should be appreciated that appropriate security measures may be taken. The service manager SM and the AAA server are not accessible directly from the internetwork, but are located in a more secure environment, e.g. in in internal cloud, where they can only be accessed by internal functions like the service control node H-SCN and interworking node H-IWF. Note that the AAA server may be located in the Fixed Access domain. However, the AAA server may also be outside of the fixed access network domain. A connection may be set up between the AAA server and the service control node H-SCN.

Figure 12:
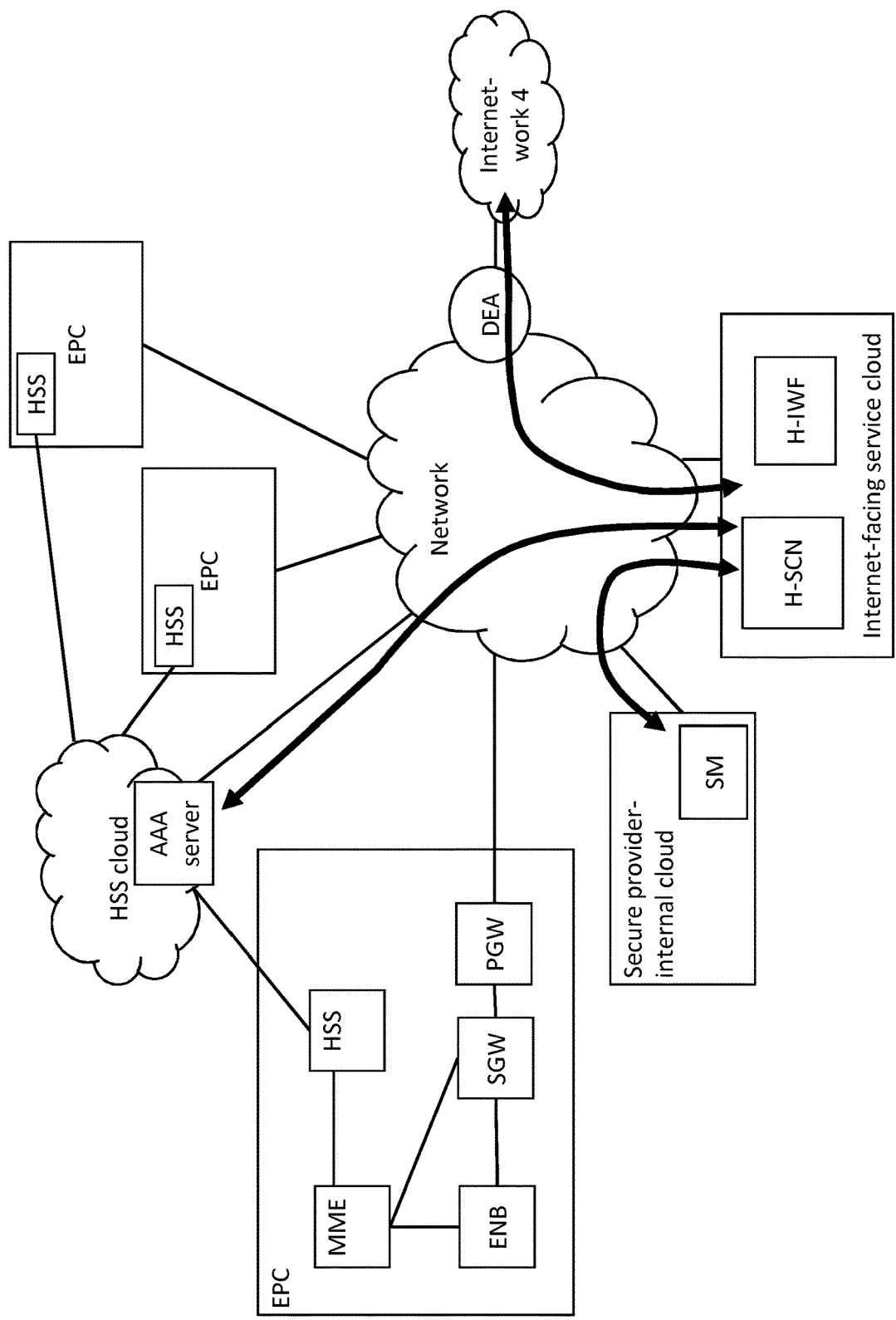

FIG. 12 shows another possible implementation of the components in the second operator network, wherein the second operator network comprises a mobile operator network. The HSSs of multiple EPCs may already form an HSS cloud which is reachable from the mobile network diameter core. The HSS contains the AAA information of the users of the second operator network. Further shown is a Diameter Edge Agent (DEA) through which the network is connected to the internetwork 4.

Figure 13:
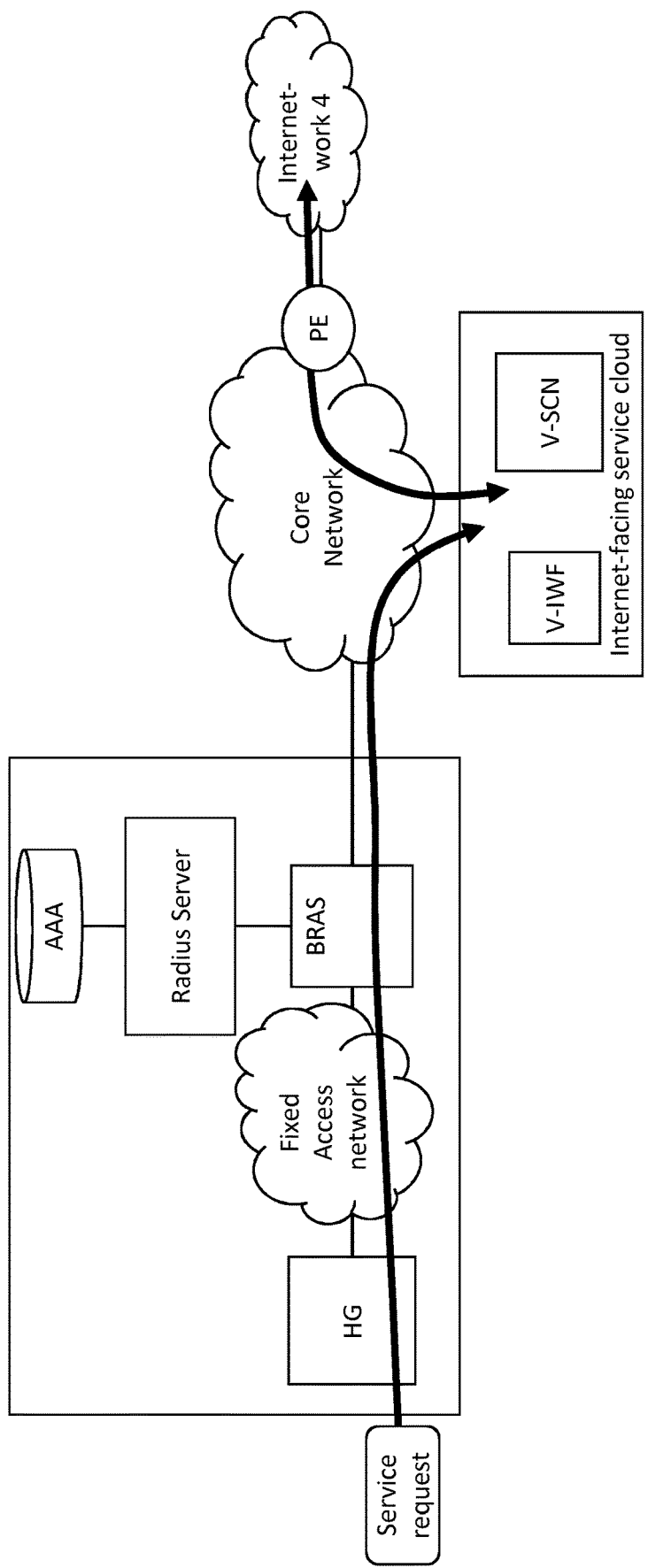

FIG. 13 shows a possible implementation of the components in the first operator network, wherein the first operator network comprises a fixed access network, a core network and networks running e.g. service platforms and other functions. The fixed access network comprises for example DSL and/or Ethernet connections. The service control node V-SCN and the interworking node V-IWF are in an internetwork-facing location. It should be appreciated that appropriate security measures may be taken.

Figure 14:
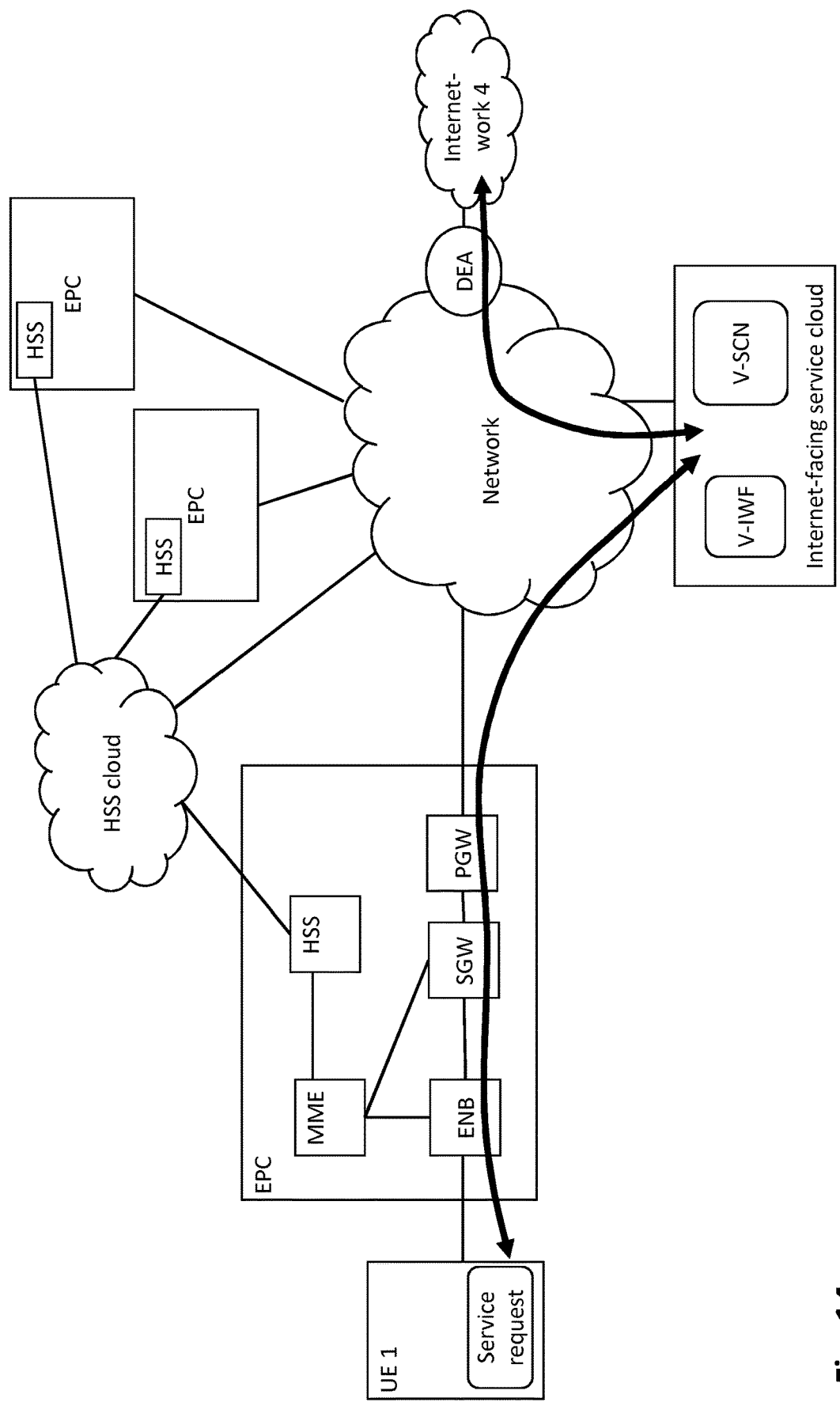

FIG. 14 shows a possible implementation of the components in the first operator network, wherein the first operator network comprises a mobile operator network. Again, the service control node V-SCN and the interworking node V-IWF are in an internetwork-facing location and are internally reachable for multiple EPCs. Appropriate security measures may be taken.

Figure 15:
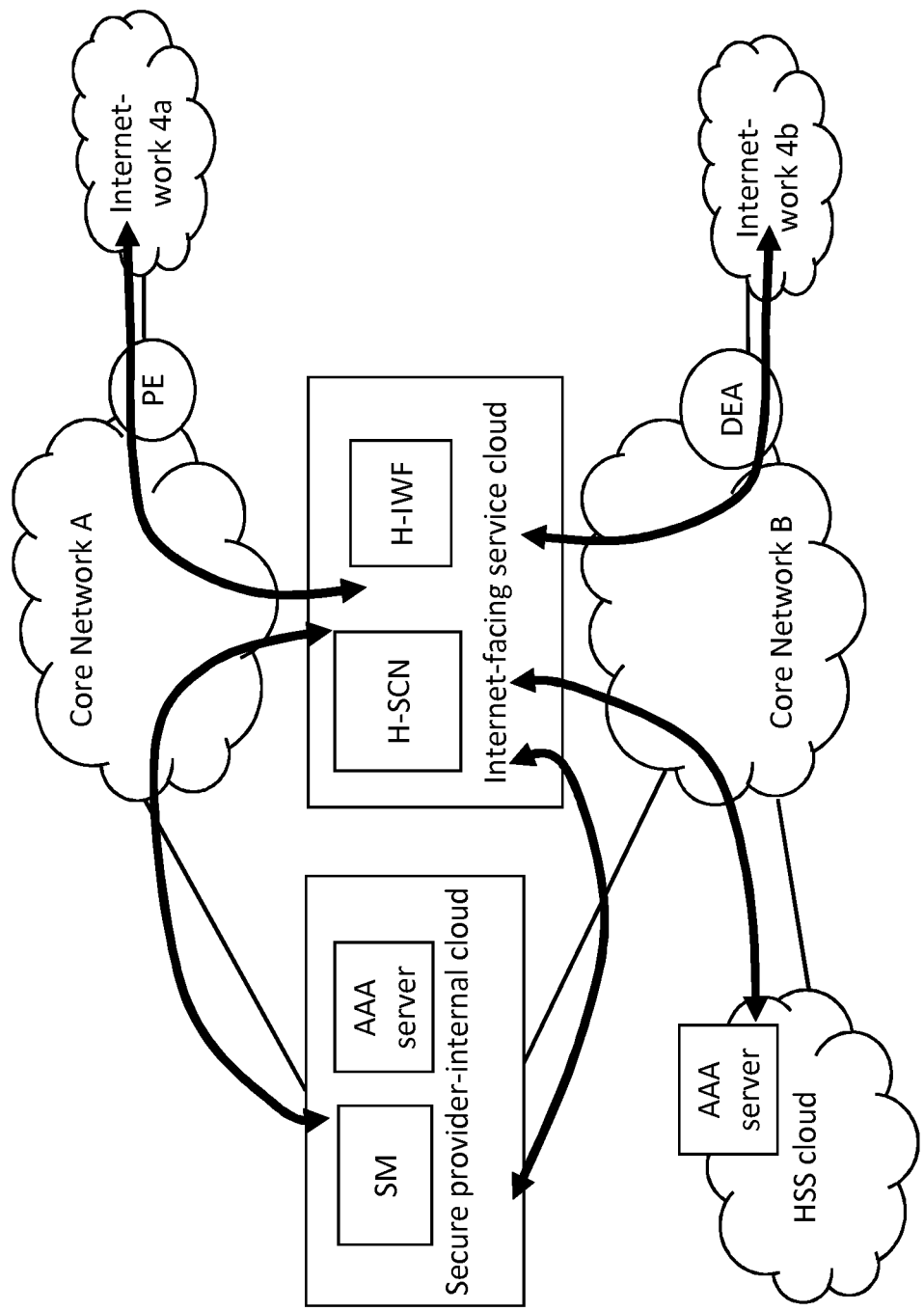

FIG. 15 shows a possible implementation of the components in the second operator network, wherein the second operator network comprises a core network A and a core network B, that are operated by a single telecommunications operator. Core network A may be a fixed core network as depicted in FIGS. 11 and 13. Connected to core network A may be a fixed access network as depicted in FIGS. 11 and 13 (not shown). Core network B may be a diameter core network to which an EPC may be connected as depicted in FIGS. 12 and 14. In this example the two core networks A and B each have their own connection to respective internetworks 4a and 4b. Internetwork 4a may comprise plain internet and internetwork 4b may comprise iBasis. As shown in FIG. 15, the components, H-SCN, H-IWF and SM, are reachable from both core networks A and B. Hence, the service request may be received in the second operator network via core network A and/or via core network B.

Figure 16:
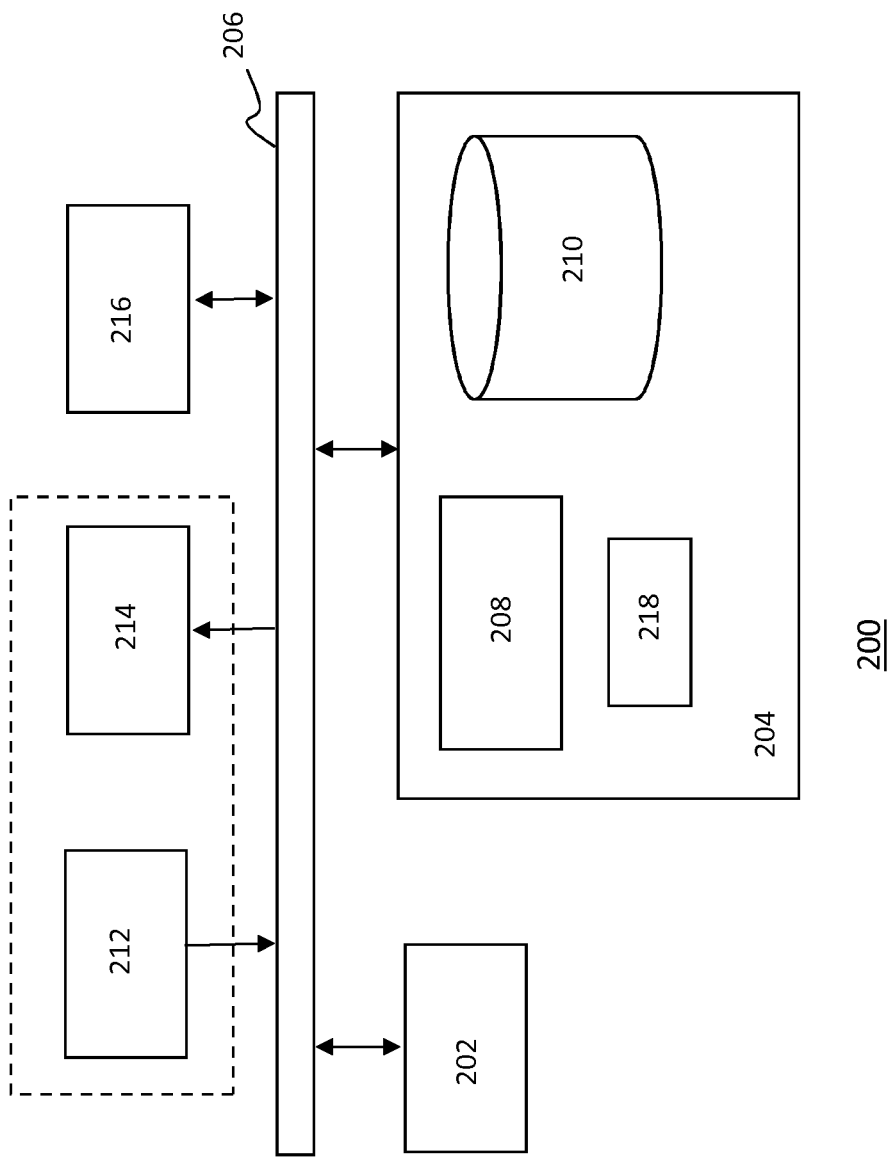
FIG. 16 is a schematic block diagram of a general system (e.g. a service control node or an interworking function) to be employed in the disclosed method.

FIG. 16 depicts a block diagram illustrating an exemplary data processing system that may be used in one of the above described methods and/or in the above described service control nodes, interworking nodes or service manager.

As shown in FIG. 16, the data processing system 200 may include at least one processor 202 coupled to memory elements 204 through a system bus 206. As such, the data processing system may store program code within memory elements 204. Further, the processor 202 may execute the program code accessed from the memory elements 204 via a system bus 206. In one aspect, the data processing system may be implemented as a computer that is suitable for storing and/or executing program code. It should be appreciated, however, that the data processing system 200 may be implemented in the form of any system including a processor and a memory that is capable of performing the functions described within this specification.

The memory elements 204 may include one or more physical memory devices such as, for example, local memory 208 and one or more bulk storage devices 210. The local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

Input/output (I/O) devices depicted as an input device 212 and an output device 214 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 16 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 200, and a data transmitter for transmitting data from the data processing system 200 to said systems, devices and/or networks. Modems, cable modems, and Ethernet cards are examples of different types of network adapter that may be used with the data processing system 200.

As pictured in FIG. 16, the memory elements 204 may store an application 218. In various embodiments, the application 218 may be stored in the local memory 208, the one or more bulk storage devices 210, or apart from the local memory and the bulk storage devices. It should be appreciated that the data processing system 200 may further execute an operating system (not shown in FIG. 16) that can facilitate execution of the application 218. The application 218, being implemented in the form of executable program code, can be executed by the data processing system 200, e.g., by the processor 202. Responsive to executing the application, the data processing system 200 may be configured to perform one or more operations or method steps described herein.

In one aspect of the present invention, the data processing system 200 may represent a service control node, interworking node, service manager, transmitter, and/or processing means as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 202 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for providing a service to a user equipment connected to a first operator network, wherein a second operator network comprises a register containing subscription information of the user equipment, the method comprising:
receiving, in the second operator network, from the first operator network a service request of the user equipment, the service request being associated with the service requested by the user equipment;
obtaining, on the basis of the service request, a service-deployment-specification for the second operator network comprising at least one network function associated with the service, wherein the service-deployment-specification comprises identifiers, addresses and/or locations associated with the second operator network and a required amount of memory to assign to each location for executing the at least one network function;
converting the service-deployment-specification for the second operator network into a generic specification, the generic specification enabling execution of the at least one network function in the first operator network for providing the service to the user equipment, wherein converting the service-deployment-specification comprises removing the identifiers, addresses and/or locations associated with the second operator network and abstracting the total amount of memory required for executing the at least one network function;
transmitting the generic specification to the first operator network.

2. The method according to claim 1, wherein converting the service-deployment-specification comprises amending a syntax and/or contents of the service-deployment-specification, wherein amending the contents optionally comprises at least one of:
amending a semantics of the service-deployment-specification; and
removing from the service-deployment-specification information associated with the second operator network.

3. The method according to claim 1, wherein the service-deployment-specification comprises at least one further network function associated with the service, the method further comprising:
excluding the at least one further network function from the generic specification;
executing the at least one further network function in the second operator network for providing the service to the user equipment on the basis of the service-deployment-specification for the second operator network.

4. The method according to claim 3, further comprising:
verifying whether the at least one further network function is instantiated in the second operator network;
when the at least one further network function is instantiated in the second operator network, using the instantiated at least one further network function for providing the service to the user equipment on the basis of the service-deployment-specification for the second operator network;
when the at least one further network function is not instantiated in the second operator network, instantiating the at least one further network function in the second operator network for providing the service to the user equipment on the basis of the service-deployment-specification for the second operator network.

5. The method according to claim 1, wherein the service relates to a further user equipment connected to a further operator network, the method further comprising:
converting the service-deployment-specification for the second operator network into a further generic specification, the further generic specification enabling execution of the at least one network function in the further operator network for providing the service to the further user equipment;
transmitting the further generic specification to the further operator network.

6. A system configured to provide a service to a user equipment connected to a first operator network, wherein a second operator network comprises a register containing subscription information of the user equipment, the system comprising:
a service control node, in the second operator network, that is configured to receive from the first operator network a service request of the user equipment, the service request being associated with the service requested by the user equipment;
a service manager that is configured, on the basis of the service request, to obtain a service-deployment-specification for the second operator network comprising at least one network function associated with the service, wherein the service-deployment-specification comprises identifiers, addresses and/or locations associated with the second operator network and a required amount of memory to assign to each location for executing the at least one network function;
an interworking node that is configured to convert the service-deployment-specification for the second operator network into a generic specification, the generic specification enabling execution of the at least one network function in the first operator network for providing the service to the user equipment, wherein converting the service-deployment-specification comprises removing the identifiers, addresses and/or locations associated with the second operator network and abstracting the total amount of memory required for executing the at least one network function; and
a transmitter that is configured to transmit the generic specification to the first operator network.

7. The system according to claim 6, wherein the interworking node is further configured to:
amend a syntax and/or contents of the service-deployment-specification, and optionally configured to amend the contents by at least one of:
amending a semantics of the service-deployment-specification; and removing from the service-deployment-specification information associated with the second operator network.

8. The system according to claim 6, wherein the service-deployment-specification comprises at least one further network function associated with the service, and wherein the service control node is further configured to:
   exclude the at least one further network function from the generic specification; and to
   execute the at least one further network function for providing the service to the user equipment on the basis of the service-deployment-specification for the second operator network.

9. The system according to claim 8, wherein the service control node is further configured to:
   verify whether the at least one further network function is instantiated in the second operator network; and to:
   when the at least one further network function is instantiated in the second operator network, use the instantiated at least one further network function for providing the service to the user equipment on the basis of the service-deployment-specification for the second operator network;
   when the at least one further network function is not instantiated in the second operator network, instantiate the at least one further network function in the second operator network for providing the service to the user equipment on the basis of the service-deployment-specification for the second operator network.

10. The system according to claim 6, wherein the service relates to a further user equipment connected to a further operator network, wherein the system is further configured to:
    convert the service-deployment-specification for the second operator network into a further generic specification, the further generic specification enabling execution of the at least one network function in the further operator network for providing the service to the further user equipment; and to
    transmit the further generic specification to the further operator network.

11. A service control node, service manager, or an interworking node for use in the system according to claim 6.

12. A method for providing a service to a user equipment connected to a first operator network, wherein a second operator network comprises a register containing subscription information of the user equipment, the method comprising:
    transmitting a service request of the user equipment to the second operator network, the service request being associated with the service requested by the user equipment;
    receiving a generic specification comprising deployment information including a total amount of memory required for executing at least one network function associated with the service from the second operator network, the generic specification being obtained in the second operator network on the basis of the transmitted service request by converting a service-deployment-specification for the second operator network into the generic specification, wherein converting the service-deployment-specification comprises removing identifiers, addresses and/or locations associated with the second operator network and abstracting the total amount of memory required for executing the at least one network function;
    executing the at least one network function in the first operator network for providing the service to the user equipment on the basis of the generic specification.

13. The method according to claim 12, further comprising:
    converting the generic specification into a service-deployment-specification for the first operator network;
    executing the at least one network function in the first operator network for providing the service to the user equipment on the basis of the service-deployment-specification for the first operator network.

14. The method according to claim 13, wherein converting the generic specification comprises amending a syntax and/or contents of the generic specification, wherein amending the contents optionally comprises at least one of:
    amending a semantics of the generic specification; and
    adding to the generic specification information associated with the first operator network.

15. The method according to claim 12, further comprising:
    verifying whether the at least one network function is instantiated in the first operator network;
    when the at least one network function is instantiated in the first operator network, using the instantiated at least one network function for providing the service to the user equipment;
    when the at least one network function is not instantiated in the first operator network, instantiating the at least one network function in the first operator network for providing the service to the user equipment.

16. A system for providing a service to a user equipment connected to a first operator network, wherein a second operator network comprises a register containing subscription information of the user equipment, the system comprising:
    a transmitter that is configured to transmit a service request of the user equipment to the second operator network, the service request being associated with the service requested by the user equipment;
    a receiver that is configured to receive a generic specification comprising s-deployment information including a total amount of memory required for executing at least one network function associated with the service from the second operator network, the generic specification being obtained in the second operator network on the basis of the transmitted service request by converting a service-deployment-specification for the second operator network into the generic specification, wherein converting the service-deployment-specification comprises removing identifiers, addresses and/or locations associated with the second operator network and abstracting the total amount of memory required for executing the at least one network function;
    a service control node that is configured to control executing the at least one network function for providing the service to the user equipment on the basis of the generic specification.

17. The system according to claim 16, further comprising:
    an interworking node that is configured to convert the generic specification into a service-deployment-specification for the first operator network; and wherein
    the service control node is further configured to execute the at least one network function in the first operator network for providing the service to the user equipment on the basis of the service-deployment-specification for the first operator network.

18. The system according to claim 17, wherein the interworking node is configured to amend a syntax and/or contents of the generic specification, and optionally configured to amend the contents by at least one of:
    amending a semantics of the generic specification for the second network; and adding to the generic specification information associated with the first operator network.

19. The system according to claim 16, wherein the service control node is further configured to
- verify whether the at least one network function is instantiated in the first operator network; and to
- when the at least one network function is instantiated in the first operator network, use the instantiated at least one network function for providing the service to the user equipment; and to
- when the at least one network function is not instantiated in the first operator network, instantiate the at least one network function in the first operator network for providing the service to the user equipment.

20. An interworking node or service control node configured for use in the system according to claim 17.

21. A non-transitory storage medium comprising a computer program product storing at least one software code portion, the software code portion, when run on a computer system, being configured for executing the method according to claim 1.

22. A non-transitory storage medium comprising a computer program product storing at least one software code portion, the software code portion, when run on a computer system, being configured for executing the method according to claim 12.

* * * * *

UNITED STATES PATENT AND TRADEMARK OFFICE
CERTIFICATE OF CORRECTION

PATENT NO. : 11,316,934 B2
APPLICATION NO. : 16/064387
DATED : April 26, 2022
INVENTOR(S) : Shuang Zhang and Adrianus Holtzer It is certified that error appears in the above-identified patent and that said Letters Patent is hereby corrected as shown below:

On the Title Page

In Item (71) Applicants:
Delete "s-Gravenhage (NL)" and insert -- 's-Gravenhage (NL) --.

In the Claims

In Claim 16, Column 26, Line 38:
Delete "comprising s-deployment" and insert -- comprising deployment --.

Signed and Sealed this
Seventh Day of June, 2022

Katherine Kelly Vidal
*Director of the United States Patent and Trademark Office*